(12) United States Patent
Cayton et al.

(10) Patent No.: US 9,986,028 B2
(45) Date of Patent: May 29, 2018

(54) TECHNIQUES TO REPLICATE DATA BETWEEN STORAGE SERVERS

(71) Applicant: Intel Corporation, Santa Clara, CA (US)

(72) Inventors: Phil C. Cayton, Hillsboro, OR (US); Eliezer Tamir, Bait Shemesh (IL); Frank L. Berry, North Plains, OR (US); Donald E. Wood, Austin, TX (US)

(73) Assignee: INTEL CORPORATION, Santa Clara, CA (US)

( * ) Notice: Subject to any disclaimer, the term of this patent is extended or adjusted under 35 U.S.C. 154(b) by 922 days.

(21) Appl. No.: 13/937,014

(22) Filed: Jul. 8, 2013

(65) Prior Publication Data

US 2015/0012607 A1    Jan. 8, 2015

(51) Int. Cl.
*G06F 15/167*    (2006.01)
*H04L 29/08*    (2006.01)

(52) U.S. Cl.
CPC ...... *H04L 67/1095* (2013.01); *H04L 67/1097* (2013.01)

(58) Field of Classification Search
CPC .. H04L 29/08; H04L 67/1097; H04L 67/1095
See application file for complete search history.

(56) References Cited

U.S. PATENT DOCUMENTS

| | | | |
|---|---|---|---|
| 7,610,348 B2 | 10/2009 | Kisley et al. | |
| 7,782,905 B2* | 8/2010 | Keels | H04L 1/0061 370/474 |
| 7,889,762 B2* | 2/2011 | Keels | H04L 49/9094 370/464 |
| 7,917,597 B1* | 3/2011 | Lentini | G06F 13/28 370/389 |
| 8,627,136 B2* | 1/2014 | Shankar | G06F 11/2028 709/212 |
| 8,706,687 B2* | 4/2014 | Fineberg | G06F 17/30368 707/609 |
| 8,966,172 B2* | 2/2015 | Malwankar | G06F 3/0611 710/1 |
| 2003/0105931 A1* | 6/2003 | Weber | G06F 11/2076 711/162 |
| 2004/0230596 A1* | 11/2004 | Veitch | G06F 11/2094 |

(Continued)

FOREIGN PATENT DOCUMENTS

CN    101212490    7/2008

OTHER PUBLICATIONS

Office Action received for German Patent Application No. 102014109519.7, dated Feb. 10, 2017, 12 pages (untranslated).

(Continued)

*Primary Examiner* — Benjamin M Thieu

(57) ABSTRACT

Examples are disclosed for replicating data between storage servers. In some examples, a network input/output (I/O) device coupled to either a client device or to a storage server may exchange remote direct memory access (RDMA) commands or RDMA completion commands associated with replicating data received from the client device. The data may be replicated to a plurality of storage servers interconnect to each other and/or the client device via respective network communication links. Other examples are described and claimed.

25 Claims, 14 Drawing Sheets

(56) References Cited

U.S. PATENT DOCUMENTS

| | | | | |
|---|---|---|---|---|
| 2005/0071623 A1* | 3/2005 | Goud | ................ | G06F 9/4416 |
| | | | | 713/100 |
| 2005/0198113 A1* | 9/2005 | Mohamed | ........... | H04L 67/1097 |
| | | | | 709/203 |
| 2007/0208820 A1* | 9/2007 | Makhervaks | ........... | H04L 67/10 |
| | | | | 709/212 |
| 2008/0109526 A1* | 5/2008 | Subramanian | .......... | H04L 69/40 |
| | | | | 709/212 |
| 2008/0147822 A1* | 6/2008 | Benhase | ................ | G06F 9/546 |
| | | | | 709/217 |
| 2009/0083392 A1* | 3/2009 | Wong | ................. | H04L 67/1097 |
| | | | | 709/212 |
| 2009/0222596 A1* | 9/2009 | Flynn | ..................... | G06F 3/061 |
| | | | | 710/22 |
| 2009/0292861 A1* | 11/2009 | Kanevsky | ............... | G06F 3/061 |
| | | | | 711/103 |
| 2010/0146068 A1* | 6/2010 | Haviv | ................... | G06F 3/0613 |
| | | | | 709/212 |
| 2012/0254480 A1* | 10/2012 | Tamir | .................... | G06F 13/385 |
| | | | | 710/22 |
| 2013/0191590 A1 | 7/2013 | Malwankar | | |
| 2013/0198311 A1* | 8/2013 | Tamir | .................... | G06F 15/167 |
| | | | | 709/212 |
| 2013/0325998 A1* | 12/2013 | Hormuth | ........... | G06F 15/17331 |
| | | | | 709/212 |
| 2014/0089447 A1* | 3/2014 | Uchida | .............. | H04L 67/1097 |
| | | | | 709/212 |
| 2014/0181365 A1* | 6/2014 | Fanning | ............. | G06F 12/0246 |
| | | | | 711/103 |
| 2014/0195634 A1* | 7/2014 | Kishore | ............. | H04L 67/1097 |
| | | | | 709/213 |
| 2014/0310370 A1* | 10/2014 | Hendel | ............... | H04L 67/1097 |
| | | | | 709/212 |
| 2014/0317219 A1* | 10/2014 | Fitch | ................... | G06F 12/0246 |
| | | | | 709/212 |
| 2014/0317336 A1* | 10/2014 | Fitch | ................... | G06F 12/0246 |
| | | | | 711/103 |
| 2015/0006478 A1* | 1/2015 | Raymond | ......... | G06F 17/30575 |
| | | | | 707/610 |
| 2015/0006663 A1* | 1/2015 | Huang | .................... | G06F 13/00 |
| | | | | 709/213 |

OTHER PUBLICATIONS

Cao et al., "Design of HPC Node with Heterogeneous Processors", 2011 IEEE International Conference on Cluster Computing (Cluster), 2011, 9 pages.

Shvachko et al., "The Hadoop Distributed File System", IEEE 26th Symposium on Mass Storage Systems and Technologies (MSST), 2010, 10 pages.

Islam et al., "High performance RDMA-based design of HDFS over InfiniBand", Proceedings of the International Conference on High Performance Computing, Networking, Storage and Analysis, IEEE Press, (2012), 12 pages.

Recio et al., "RFC 5040—A Remote Directory Memory Access Protocol Specification", Network Working Group, Oct. 2007, 66 pages.

Office Action received for Chinese Patent Application No. 201410321310.3, dated Mar. 3, 2017, 7 pages (untranslated).

* cited by examiner

1000

SENDING AN RDMA COMMAND MESSAGE TO STORE DATA FOR REPLICATION AT A PLURALITY OF STORAGE SERVERS, THE RDMA COMMAND MESSAGE SENT TO ONE OR MORE STORAGE SERVERS FROM AMONG THE PLURALITY OF STORAGE SERVERS VIA AT LEAST ONE NETWORK CONNECTION BETWEEN THE ONE OR MORE STORAGE SERVERS AND A CLIENT DEVICE
*1002*

RECEIVE ONE OR MORE RDMA COMMAND COMPLETION MESSAGES FROM THE ONE OR MORE STORAGE SERVERS TO INDICATE REPLICATION OF THE DATA BETWEEN AT LEAST A FIRST STORAGE SERVER AND A SECOND STORAGE SERVER FROM AMONG THE PLURALITY OF STORAGE SERVERS.
*1004*

RECEIVE A FIRST RDMA COMMAND MESSAGE FROM A REMOTE CLIENT VIA A FIRST NETWORK CONNECTION, THE FIRST RDMA COMMAND MESSAGE ASSOCIATED WITH STORING DATA AT A FIRST STORAGE DEVICE CONTROLLED BY A FIRST NVMe CONTROLLER MAINTAINED AT A FIRST STORAGE SERVER
*1402*

FORWARD THE FIRST RDMA COMMAND MESSAGE TO THE FIRST NVMe CONTROLLER TO CAUSE THE FIRST NVMe CONTROLLER TO OBTAIN THE DATA FROM THE REMOTE CLIENT RESPONSIVE TO THE RDMA COMMAND MESSAGE AND STORE THE DATA TO THE FIRST STORAGE DEVICE
*1404*

FORWARDING AN RDMA COMMAND COMPLETION MESSAGE TO THE CLIENT DEVICE FROM THE FIRST NVMe CONTROLLER TO INDICATE THE STORING OF THE DATA
*1406*

RECEIVE A SECOND RDMA COMMAND MESSAGE VIA A SECOND NETWORK CONNECTION FROM A SECOND STORAGE SERVER, THE SECOND RDMA COMMAND MESSAGE ASSOCIATED WITH REPLICATING THE DATA STORED TO THE FIRST STORAGE DEVICE
*1408*

FORWARD THE SECOND RDMA COMMAND MESSAGE TO THE FIRST NVMe CONTROLLER TO CAUSE THE DATA STORED AT THE FIRST STORAGE DEVICE TO BE READABLE BY THE SECOND STORAGE SERVER TO ENABLE THE SECOND STORAGE SERVER TO REPLICATE THE DATA VIA STORING THE DATA TO A SECOND STORAGE DEVICE CONTROLLED BY A SECOND NVMe CONTROLLER MAINTAINED AT THE SECOND STORAGE SERVER
*1410*

*FIG. 14*

TECHNIQUES TO REPLICATE DATA BETWEEN STORAGE SERVERS

TECHNICAL FIELD

Examples described herein are generally related to replicating data from a client device to a plurality of storage servers.

BACKGROUND

A typical solution to data reliability and recoverability may be use of redundant array of independent disks (RAID). Implementations of RAID may range from simple mirroring to redundant parity blocks. Costs associated with storage capacity have continued to drop. Also network access times or network bandwidth capabilities have improved such that network accessible storage can be utilized at comparable times to that of locally accessible storage. As a result of lower costs and greater network bandwidth capabilities, many data centers such as internet public data centers (IPDC) use multiple network nodes or storage servers to manage data reliability and improve data access scalability.

BRIEF DESCRIPTION OF THE DRAWINGS

FIG. 10 illustrates an example of a first logic flow.
FIG. 14 illustrates an example of a second logic flow.

DETAILED DESCRIPTION

Figure 1:
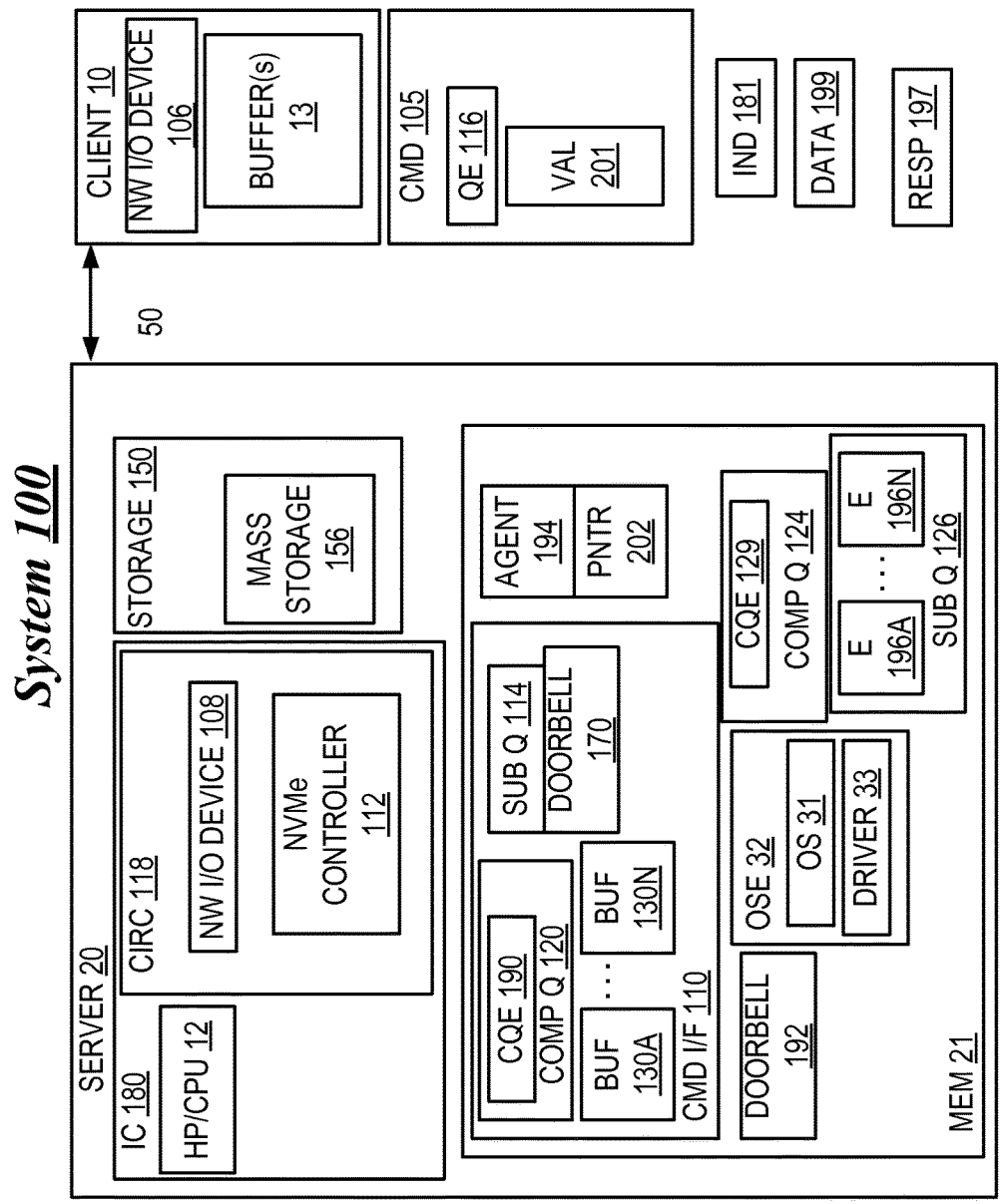
FIG. 1 illustrates a first example system.

As contemplated in the present disclosure, data centers may use multiple network nodes or storage servers to manage data reliability and improve data access scalability. The multiple storage servers to replicate data may be due in part to storage capacities for hard disk drives or solid state drives (SSDs) expanding such that the various RAID schemes are becoming difficult or impractical to use to protect data. For example, a RAID5 scheme that uses block stripping with distributed parity blocks may have an unacceptably long rebuild time and the probability of experiencing an unrecoverable error while recovering from a previous error may no longer be negligible. Another RAID scheme, RAID6 attempts to address these issues with RAID5 by adding a redundant parity block. However, adding the redundant parity block may significantly increase data protection overhead.

In some examples, schemes that use multiple storage servers may use each storage server as a redundant unit similar to hard disks or hard drives in a RAID scheme. For these multiple storage server schemes, replication of data from a client device may be cascaded. In other words, a client device may issue a storage request to a storage server and the storage server then replicates the data (including providing appropriate error correction codes/checksums) to other storage servers. In some solutions, the server acknowledges completion of a write/replication of the data before actually performing the replication. This may be to avoid latencies/overhead from multiple transactions. However, the client devices may have no confirmation that the data has been successfully replicated to the other storage servers.

Recently, storage servers have begun including both network (NW) input/output (I/O) devices and storage controllers having enhanced capabilities that try to minimize operating system and host processor involvement. For example, hardware elements such as command submission and command completion queues may be utilized by a storage server's NW I/O device and storage controllers to enable a client or host device to remotely access storage via a process known as remote direct memory access (RDMA).

Storage controllers maintained at these remotely accessible storage servers are also being designed to operate in compliance with relatively new interconnect communication protocols that may work well with RDMA. Further, these storage controllers may control access to hard disk drives (HDDs) or solid state drives (SSDs). The SSDs may include, but are not limited to, various types of non-volatile memory such as 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM). In some examples, access to HDDs or SSDs may include use of interconnect communication protocols described in industry standards or specifications (including progenies or variants) such as the Peripheral Component Interconnect (PCI) Express Base Specification, revision 3.0, published in November 2010 ("PCI Express" or "PCIe") and/or use of types of controller interfaces for PCIe based SSDs such as the Non-Volatile Memory Express (NVMe) Specification, revision 1.1, published in October 2012.

Storage controllers that operate in compliance with the NVMe Specification ("NVMe controllers") may be capable of minimizing operating system and host processor involvement when allowing a remote client or host device to access storage devices such as SSDs and use these storage devices to support reliability, availability and serviceability (RAS) solutions. These types of remotely accessible, NVMe controlled storage devices, when coupled with a high-speed network connection (e.g., 10 gigabits per second (Gbps) or higher), may be effectively used to support RAS solutions that include multiple storage servers. However, as mentioned above, merely cascading the replication of data between a client device and storage server may lead to no clear indication that data has been successfully replicated between storage servers. It is with respect to these and other challenges that the examples described herein are needed.

In some examples, techniques to replicate data between storage servers may be implemented. For these examples, the techniques may include sending, at a NW I/O device coupled to a client device, an RDMA command message to store data for replication at a plurality of storage servers. The RDMA command message may be sent to one or more storage servers from among the plurality of storage servers via at least one network connection between the one or more storage servers and the client device. Also, for these examples, one or more RDMA command completion messages may be received from the one or more storage servers to indicate replication of the data between at least a first storage server and a second storage server from among the plurality of storage servers.

According to some other examples, the techniques may include receiving, at a NW I/O device coupled to a first storage server, a first RDMA command message from a remote client via a first network connection. For these other examples, the first RDMA command message may be associated with storing data at a first storage device controlled by a first NVMe controller maintained at the first storage server. The first RDMA command message may then be forwarded to the first NVMe controller to cause the first NVMe controller to obtain the data from the remote client responsive to the RDMA command message and store the data to the first storage device. An RDMA command completion message may then be forwarded to the remote client from the first NVMe controller to indicate the storing of the data. These other examples may also include receiving a second RDMA command message via a second network connection from a second storage server. The second RDMA command message may be associated with replicating the data stored to the first storage device. The second RDMA command message may then be forwarded to the first NVMe controller. The first NVMe controller may then cause the data stored at the first storage device to be readable by the second storage server to enable the second storage server to replicate the data via storing the data to a second storage device controlled by a second NVMe controller maintained at the second storage server.

FIG. 1 illustrates a first example system. As shown in FIG. 1 the first example system includes a system 100 having a client 10 that is communicatively coupled, via network 50, to server 20. According to some examples, the terms "host computer", "host device", "host", "client device", "client" and "client node" may be used interchangeably, and may mean, for example, without limitation, one or more end stations, mobile internet devices, smart phones, media devices, input/output (I/O) devices, tablet computers, appliances, intermediate stations, network interfaces, clients, and/or portions thereof. Also, in some examples, the terms "server" "storage server", "server node", "replication server", "storage node", or "remote storage server" may be used interchangeably, and may mean, for examples, without limitation, a server remotely accessible (e.g., via a network connection) to a client device. Although client 10, server 20, and network 50 will be referred to in the singular, it should be understood that each such respective component may comprise a plurality of such respective components without departing from these examples.

According to some examples, a "network" may be or comprise any mechanism, instrumentality, modality, and/or portion thereof that permits, facilitates, and/or allows two or more entities to be communicatively coupled together. Also in some examples, a first entity may be "communicatively coupled" to a second entity if the first entity is capable of transmitting to and/or receiving from the second entity one or more commands and/or data. Also, data and information may be used interchangeably, and may be or comprise one or more commands (for example one or more program instructions), and/or one or more such commands may be or comprise data and/or information. Also for these examples, an "instruction" may include data and/or one or more commands.

Client 10 may include remote direct memory access (RDMA)-enabled network interface controller (RNIC) herein referred to as network (NW) I/O device 106 and/or one or more (and in the example shown in FIG. 1, a plurality of) buffers 13.

As shown in FIG. 1, server 20 may include one or more integrated circuit (IC) chips 180, memory 21, and/or storage 150. One or more chips 180 may have circuitry 118 that may include a NW I/O device 108, a manageability module 109 or an NVMe controller 112. Although not shown in FIG. 1, in some examples NW I/O device 108 and/or NVMe controller 112 may be separately attachable devices that couple to server 20 and include circuitry as described further below.

Also as shown in FIG. 1, the one or more chips 180 that may be incorporated within one or more multi-core host processors (HP) and/or central processing units (CPU) 12. Although not shown in the Figures, server 20 also may comprise one or more chipsets or devices to include, but not limited to memory or input/output controller circuitry). NW I/O device 108, NVMe controller 112, and/or HP/CPU 12 may be capable of communicating with each other. Additionally, NW I/O device 108, NVMe controller 112, manageability module 109 and/or HP/CPU 12 may be capable of accessing and/or communicating with one or more other components of server 20 (such as memory 21 and/or storage 150), via one or more such chipsets. In some examples, client 10 and/or NW I/O device 106 may be remote (e.g., geographically remote) from server 20 and/or NW I/O device 108.

According to some examples, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also, in some examples, a processor, HP, CPU, processor core (PC), core, and controller each may comprise respective circuitry capable of performing one or more arithmetic and/or logical operations, and/or of executing one or more instructions. An integrated circuit chip may include one or more microelectronic devices, substrates, and/or dies. Although not shown in the FIG. 1, server 20 may have a graphical user interface system that may include, e.g., a respective keyboard, pointing device, and display system that may permit a human user to input commands to, and monitor the operation of, server 20 and/or system 100. Also, memory may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory.

In some examples, storage 150 may include mass storage 156. For these examples, storage 150 may include one or more devices into, and/or from which, data may be stored and/or retrieved, respectively. Also, for these examples, mass storage may include storage capable of non-volatile storage of data. For example, mass storage 156 may include, without limitation, one or more non-volatile electro-mechanical, magnetic, optical, and/or semiconductor storage devices. These devices may include hard disk drives (HDDs) or solid state drives (SSDs). The SSDs may have non-volatile types of memory such as 3-dimensional cross-point memory, flash memory, ferroelectric memory, silicon-oxidenitride-oxide-silicon (SONOS) memory, polymer memory, nanowire, ferroelectric transistor random access memory (FeTRAM or FeRAM), nanowire or electrically erasable programmable read-only memory (EEPROM).

According to some examples, manageability module 109, NVMe controller 112, storage 150 or mass storage 156 may be capable of operating in compliance with the PCIe Specification and/or the NVMe Specification.

One or more machine-readable program instructions may be stored in memory 21. In operation of server 20, these machine-readable instructions may be accessed and executed by one or more host processors 12, NW I/O device 108, and/or NVMe controller 112. When executed by one or more HP 12, these one or more machine-readable instructions may result in one or more operating system environments (OSE) 32 being executed by one or more HP 12, and becoming resident in memory 21. Also when these machine-readable instructions are executed by NW I/O device 108 and/or NVMe controller 112, these one or more instructions may result in one or more command interfaces 110 of NVMe controller 112, one or more doorbells 192, one or more pointers 202, one or more agents 194, one or more completion queues 124, and/or one or more submission queues 126 being established and/or executed by NW I/O device 108 and/or NVMe controller 112, and/or becoming resident in memory 21.

According to some examples, one or more OSE 32 may include one or more operating systems (OS) 31 and/or one or more NW I/O device and/or NVMe controller drivers 33. These one or more drivers 33 may be mutually distinct from one or more OS 31. Alternatively or additionally, without departing from these examples, one or more respective portions of one or more OS 32 and/or drivers 33 may not be mutually distinct from each other and/or may be included in each other. Likewise, without departing from these examples, circuitry 118, NW I/O device 108, manageability module 109 and/or NVMe controller 112 may be distinct from, or alternatively, may be included in the one or more not shown chipsets and/or HP 12. Also without departing from these examples, one or more portions of memory 21 may be included in or maintained at NW I/O device 108, manageability module 109, NVMe controller 112, circuitry 118, HP 12, and/or IC 180.

In some examples, a portion or subset of an entity may include all or less than all of the entity. Also, for these examples, a process, thread, daemon, program, driver, operating system, application, kernel, and/or virtual machine monitor each may (1) include and/or (2) result in and/or from, execution of one or more operations and/or program instructions.

According to some examples, a command interface may facilitate, permit, and/or implement, at least in part, exchange, transmission, and/or receipt of data and/or one or more commands. For these examples, a queue, buffer, and/or doorbell may be one or more locations (e.g., specified and/or indicated by one or more addresses) in memory in which data and/or one or more commands may be stored, at least temporarily. Also, a queue element may include data and/or one or more commands to be stored and/or stored in one or more queues, such as, for example, one or more descriptors and/or one or more commands. Additionally, for these examples, a pointer may indicate, address, and/or specify one or more locations and/or one or more items in memory.

In some examples, NW I/O device 106 and NW I/O device 108 may exchange data and/or commands via network 50 in accordance with one or more protocols that may comply and/or be compatible with an RDMA protocol such as internet wide area RDMA protocol (iWARP), Infiniband (IB) protocol, Ethernet protocol, transmission control protocol/internet protocol (TCP/IP) protocol and/or RDMA over converged Ethernet (RoCE) protocol. For example, the iWARP protocol may comply and/or be compatible with Recio et al., "An RDMA Protocol Specification," Internet Draft Specification, Internet Engineering Task Force (IETF), 21 Oct. 2002. Also for example, the Ethernet protocol may comply and/or be compatible with Institute of Electrical and Electronics Engineers, Inc. (IEEE) Std. 802.3-2008, Dec. 26, 2008. Additionally, for example, the TCP/IP protocol may comply and/or be compatible with the protocols described in Internet Engineering Task Force (IETF) Request For Comments (RFC) 791 and 793, published September 1981. Also, the IB protocol may comply and/or be compatible with Infiniband Architecture Specification, Vol. 2, Rel. 1.3, published November 2012. Additionally, for example, the RoCE protocol may comply and/or be compatible with Supplement to Infiniband Architecture Specification, Vol. 1, Rel. 1.2.1, Annex A16: "RDMA over Converged Ethernet (RoCE)", published April 2010. Many different, additional, and/or other protocols may be used for such data and/or command exchange without departing from these examples (e.g., earlier and/or later-developed versions of the aforesaid, related, and/or other protocols).

According to some examples, circuitry 118 may permit and/or facilitate NW I/O device 106's access, via NW I/O device 108, of one or more command interfaces 110. For example, circuitry 118 may permit and/or facilitate NW I/O device 106 being able to so access one or more command interfaces 110 in a manner that is independent of OSE 32 in server 20. This accessing may include, for example, the writing of at least one queue element (e.g., one or more queue elements (QE) 116) to one or more submission queues 114 in one or more command interfaces 110. This may cause NW I/O device 108 for forward commands to NVMe controller 112 to perform one or more operations involving storage 150 and/or mass storage 156 associated with NVMe controller 112. NVMe controller 112 may perform these one or more operations in response to the one or more queue elements 116 (e.g., after and in response to the one or more queue elements 116 being written into one or more submission queues 114 and then forwarded by NW I/O device 108). These one or more operations involving storage 150 and/or mass storage 156 may comprise one or more write operations and/or one or more read operations involving storage 150 and/or mass storage 156. For these examples, client 10 thus may be able to access storage 150 and/or mass storage 156 via the one or more read operations and/or one or more write operations executed by NVMe controller 112.

By way of example, in operation of system 100, client 10 and/or NW I/O device 106 may authenticate client 10 and/or NW I/O device 106 to server 20 and/or logic and/or features at NW I/O device 108. This may result in client 10 and/or NW I/O device 106 being granted permission to access devices maintained at or controlled by elements of server 20 (e.g., via NW I/O device 108). Contemporaneously, after or prior to this, NW I/O device 108, NVMe controller 112, one or more agents 194, and/or OSE 32 may generate, establish, and/or maintain, in memory 21 one or more interfaces 110 and/or one or more indicators 181. The one or more interfaces 110 and/or indicators 181 may indicate where in memory 21 (e.g., one or more locations) one or more interfaces 110 and/or the components thereof may be located. For example, one or more indicators 181 may indicate one or more locations in memory 21 where one or more submission queues 114, one or more completion queues 120, one or more doorbells 170, and/or one or more buffers 130A ... 130N may be located. NW I/O device 108 may provide, via network 50, one or more indicators 181 to NW I/O device 106. Thereafter, NW I/O device 106 may use one or more of the one or more indicators 181 to access one or more command interfaces 110 and/or one or more components of the one or more command interfaces 110. One or more indicators 181 may be or include one or more handles (e.g., assigned to transaction contexts) for one or more regions in memory 21, such as, in this example, one or more service tags (STags) that may comply and/or may be compatible with an RDMA (e.g., iWARP, IB, RoCE) protocol. In some examples, the one or more regions in memory 21 may be included in one or more buffers maintained to facilitate remote access of storage 150 or mass storage 156 by client 10.

After receiving one or more indicators 181, client 10 and/or NW I/O device 106 may issue one or more commands 105 to server 20, via network 50 and NW I/O device 108, to NVMe controller 112 in a manner that by-passes and/or is independent of the involvement of OSE 32. The one or more commands 105 may command NVMe controller 112 to perform one or more operations involving storage 150 and/or mass storage 156.

According to some examples, one or more commands 105 may comply and/or be compatible with an RDMA (e.g., iWARP, IB, RoCE) protocol. One or more commands 105 may include and/or specify one or more queue elements 116 that may embody and/or indicate the one or more operations involving storage 150 and/or mass storage 156 that are being commanded. Although not shown in FIG. 1, one or more commands 105 may comprise, specify, and/or indicate one or more of the indictors 181 that may indicate one or more locations in one or more submission queues 114 as one or more intended destinations of one or more queue elements 116.

In some examples, one or more queue elements 116 may result in NW I/O device 108 forwarding a command to have NVMe controller 112 perform or execute one or more write operations involving storage 150 and/or mass storage 156. Therefore, one or more commands 105 also may include and/or specify that data 199 to be written, as a result of NW I/O device 108 forwarding one or more queue elements 116 to NVMe controller 112, to storage 150 and/or mass storage 156. One or more commands 105 may include, specify, and/or indicate one or more of the indicators 181 that may indicate one or more locations of one or more buffers (e.g., buffer(s) 13) to which data 199 is to be written (at least temporarily) to a client 10.

In some examples, in response to receipt of one or more commands 105, NW I/O device 108 may directly write (e.g., in accordance with RDMA (e.g., iWARP, IB, RoCE) protocol and/or in a manner that by-passes and/or is independent of OSE 32), in the manner commanded by one or more commands 105, one or more queue elements 116 and data 199 to one or more submission queues 114 and one or more buffers 130A, respectively. Thus, in effect, by issuing one or more commands 105 to NW I/O device 108, NW I/O device 106 may write one or more queue elements 116 and data 199 to one or more submission queues 114 and one or more buffers 130A, respectively.

One or more commands 105 also may comprise and/or specify one or more values 201 and one or more of the indicators 181 that may indicate one or more locations of one or more doorbells 170 to which one or more values 201 may be written. In response to these one or more values 201 and these one or more of the indicators 181 in one or more commands 105, NW I/O device 108 may directly write (e.g., in accordance with RDMA (e.g., iWARP, IB, RoCE) protocol and/or in a manner that by-passes and/or is independent of OSE 32), in the manner commanded by one or more commands 105, one or more values 201 in doorbell 170. The writing of one or more values 201 in doorbell 170 may ring doorbell 170. Thus, in effect, by issuing one or more commands 105 to NW I/O device 108, NW I/O device 106 may ring doorbell 170.

According to some examples, the ringing of a doorbell that is associated with an entity may comprise and/or involve the writing one or more values to one or more memory locations (e.g., associated with, comprising, and/or embodying the doorbell) that may result in and/or trigger the entity performing one or more operations and/or actions. In some examples, the doorbells 170 and/or 192 may appear to CPU 12 and/or server 20 as one or more respective memory locations (not shown) in respective memory (not shown) in NVMe controller 112 and/or NW I/O device 108, respectively.

In some examples, responsive to the ringing of doorbell 170, NVMe controller 112 may return to a fully operational state (e.g., if NVMe controller 112 had previously entered a reduced power state relative to this fully operational state), and may read one or more queue elements 116 that were written into one or more submission queues 114. NVMe controller 112 may then execute the one or more commands that are specified and/or embodied by one or more queue elements 116. This may result in NVMe controller 112 performing the one or more operations (e.g., one or more writes to storage 150 and/or mass storage 156 of data 199 stored in one or more buffers 130A) involving storage 150 and/or mass storage 156.

According to some examples, after completion of these one or more operations involving storage 150 and/or mass storage 156, NVMe controller 112 may generate and write one or more completion queue elements (CQE) 129 to one or more completion queues 124. Also after completion of these one or more operations involving storage 150 and/or mass storage 156, NVMe controller 112 or manageability module 109 may write one or more values to one or more doorbells 192 associated with NW I/O device 108. This may ring one or more doorbells 192. In response to the ringing of one or more doorbells 192, NW I/O device 108 may write (e.g., via one or more RDMA write operations) one or more completion queue elements 190 to one or more completion queues 120 and then forward the one or more completion queue elements 190 to one or more buffers 13 in client 10 (e.g., via one or more responses 197).

In some examples, after one or more (e.g., several) such write and/or read operations involving storage 150 and/or mass storage 156 have been performed, one or more agents 194 may carry out certain management functions. For example, one or more agents 194 may establish one or more submission queue entries/elements (E) 196A ... 196N in one or more submission queues 126 associated with NW I/O device 108 and/or one or more submission queue entries/elements QE A ... QE N in table 250 (see FIG. 2). As is discussed more below, these elements 196A ... 196N and/or QE A ... QE N, when executed by NW I/O device 108, may permit and/or facilitate copying or forwarding of one or more other queue entries (e.g., one or more NVMe controller 112 completion entries 129) to client 10 and/or NW I/O device 106 and/or data read by NVMe controller 112.

According to some examples, these management functions also may include the updating (e.g., appropriately advancing) by one or more agents 194 of one or more pointers (e.g., ring pointers PNTR 202) associated with one or more queue pairs (e.g., submission/completion queue pair 114, 120 and/or submission/completion queue pair 126, 124) associated with the NW I/O controller 108 and the NVMe controller 112. This may permit new entries to the queue pairs to be stored at locations that will not result in erroneous overwriting of other entries in the queue pairs. Additionally, as part of these management functions, the one or more agents 194 may indicate one or more of the buffers 130A . . . 130N that may be available to be reused.

As another example, one or more queue elements 116 may command that NVMe controller 112 perform one or more read operations involving storage 150 and/or mass storage 156. Therefore, one or more commands 105 also may include and/or specify one or more locations (e.g., Namespaces) in storage 150 and/or mass storage 156 from which NVMe controller 112 is to read data 199, as a result of executing one or more queue elements 116.

According to some examples, in response to receipt of one or more commands 105, NW I/O device 108 may directly write (e.g., in accordance with an RDMA (e.g., iWARP, IB, RoCE) protocol and/or in a manner that by-passes and/or is independent of OSE 32), in the manner commanded by one or more commands 105, one or more queue elements 116 to one or more submission queues 114. Thus, in effect, by issuing one or more commands 105 to NW I/O device 108, NW I/O device 106 may write one or more queue elements 116 to one or more submission queues 114 and one or more buffers 130A, respectively.

In this example, one or more commands 105 also may comprise and/or specify one or more values 201 and one or more of the indicators 181 that may indicate one or more locations of one or more doorbells 170 to which one or more values 201 are to be written. In response to these one or more values 201 and these one or more of the indicators 181 in one or more commands 105, NW I/O device 108 may directly write (e.g., in accordance with an RDMA (e.g., iWARP, IB, RoCE) protocol and/or in a manner that by-passes and/or is independent of OSE 32), in the manner commanded by one or more commands 105, one or more values 201 in doorbell 170. The writing of one or more values 201 in doorbell 170 may ring doorbell 170. Thus, in effect, by issuing one or more commands 105 to NW I/O device 108, NW I/O device 106 may ring doorbell 170.

According to some examples, responsive to the ringing of doorbell 170, NVMe controller 112 may return to a fully operational state (e.g., if NVMe controller 112 had previously entered a reduced power state relative to this fully operational state), and may read one or more queue elements 116 that were written into one or more submission queues 114. NVMe controller 112 then may execute the one or more commands that are specified and/or embodied by one or more queue elements 116. This may result in NVMe controller 112 performing the one or more operations (e.g., one or more reads of storage 150 and/or mass storage 156 to obtain data 199) involving storage 150 and/or mass storage 156 and storing data 199 in one or more buffers (e.g., one or more buffers 130A).

In some examples, after completion of these one or more operations involving storage 150 and/or mass storage 156, NVMe controller 112 may generate and write one or more completion queue elements 129 to one or more completion queues 124. Also after completion of these one or more operations involving storage 150 and/or mass storage 156, NVMe controller 112 also may write one or more values to one or more doorbells 192 associated with NW I/O device 108. This may ring one or more doorbells 192. Responsive to the ringing of one or more doorbells 192, NW I/O device 108 may obtain queue elements 129 from the one or more completion queues 124 and forward or write one or more completion queue elements 190 to one or more completion queues 120 to facilitate the transfer of data 199 (e.g., via on or more RDMA write operations with NW I/O device 106) to one or more buffers 13 in client 10 (e.g., via one or more responses 197). Alternatively, manageability module 109 may obtain queue elements 129 from completion queues 124 and forward or write completion queue elements 190 to completion queues 120 to facilitate the transfer of data 199 to buffers 13.

According to some examples, command interface 110 may be asynchronous in that, for example, completion queue elements may not be stored in an order in one or more completion queues 120 that corresponds to (1) the order in which command queue elements are stored in the one or more submission queues 114, (2) the order in which such command queue elements are forwarded for execution and/or completion by the NVMe controller 112, and/or (3) the order in which completion queue elements 190 are stored in one or more completion queues 120 and/or provided to NW I/O device 106 and/or client 10. In operation, NW I/O device 106 and/or client 10 may appropriately reorder, in the case of write commands issued from the client 10 and/or NW I/O device 106, corresponding completion queue elements 190 received from NW I/O device 108. However, in the case of read commands, in this embodiment, in order to permit respective data read from storage 150 and/or mass storage 156 to be appropriately associated with corresponding completion queue elements 190 for transmission to client 10 and/or NW I/O device 106, each completion queue element (e.g., completion queue element 190) resulting from completion indications placed in completion queues 120 by NW I/O device 108 may include the elements illustrated in FIG. 2.

Figure 2:
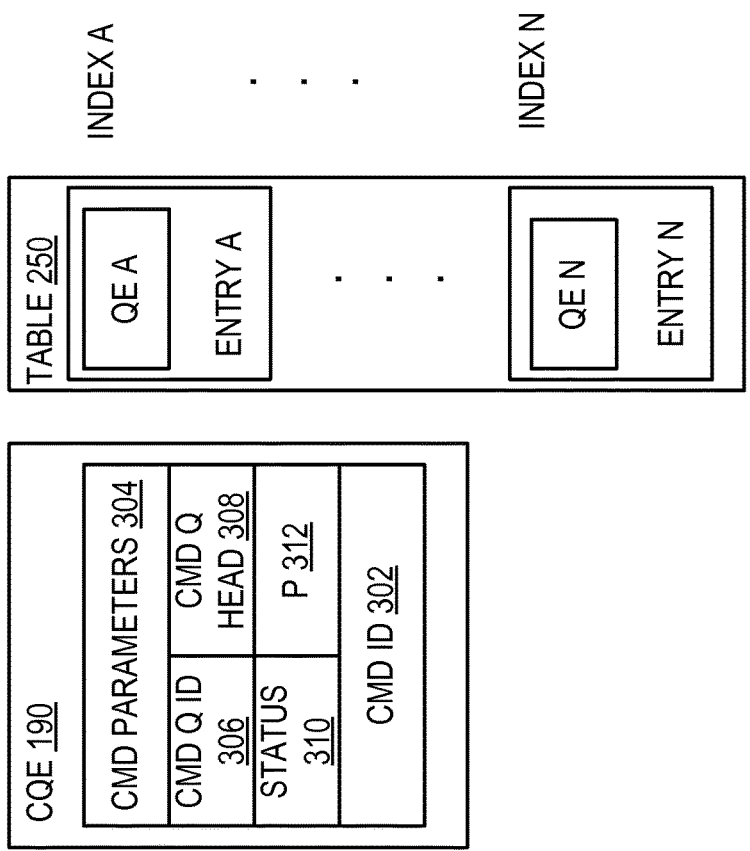
FIG. 2 illustrates an example completion queue element.

As shown in FIG. 2, completion queue element 200 (e.g., completion queue element 190) may include one or more command parameters 304, one or more command queue identifiers 306, one or more command queue head position indicators 308, status information 310, one or more queue phase bit (P) 312, and/or one or more command identifiers 302. One or more command parameters 304 may be and/or indicate one or more command specific parameters of the one or more queue elements 116 and/or commands 105 that may correspond to and/or be associated with the one or more completion queue elements 190. One or more command queue identifiers 306 may indicate and/or specify the one or more submission queues 114 to which the one or more queue elements 116 were written. One or more command queue head position indicators 308 may indicate the current position (e.g., in the one or more submission queues 114 identified by one or more command queue identifiers 306) at which the one or more queue elements 116 may be located. Status information 310 may indicate whether the one or more commands 105 and/or one or more queue elements 116 were successfully performed by the NVMe controller 112. One or more phase bits 312 may indicate whether the one or more completion queue elements 190 constitute the most recently added valid entry (e.g., to service) in one or more completion queues 120. One or more command identifiers 302 may indicate and/or be identical to one or more corresponding command identifiers in the corresponding one or more queue elements 116. Command identifiers 302 may permit one or more completion queue elements 190 to be correctly associated with one or more corresponding queue elements 116 and/or with the respective data 199 read from the storage 150 and/or mass storage 156 as a result of the execution of these one or more corresponding queue elements 116.

In some examples, one or more command identifiers 302 may be selected so as not to collide with and/or be identical to any other command identifiers that may be currently used by any completion queue elements that have not yet been provided to client 10 and/or NW I/O device 106 by NW I/O device 108. The command identifiers that may be used in system 100 may be pre-calculated and/or pre-generated, and may be used as respective indices INDEX A . . . INDEX N for respective entries ENTRY A . . . ENTRY N in a table 250 that may be stored in memory 21. Each of the entries ENTRY A . . . ENTRY N in the table 250 may store one or more respective pre-calculated and/or pre-generated command queue elements QE A . . . QE N that may be associated with NW I/O device 108. Each respective element QE A . . . QE N may be associated with one or more respective buffers in one or more buffers 130A . . . 130N. Each of the buffers in one or more buffers 130A . . . 130N into which NVMe controller 112 may store data read from storage 150 and/or mass storage 156 also may be associated with one or more respective submission identifiers used in system 100 and/or respective entries ENTRY A . . . ENTRY N.

The command queue elements QE A . . . QE N may be stored and/or maintained in table 250 by client 10 and/or one or more agents 194. If one or more buffers 130A . . . 130N are statically allocated, table 250 may be static, and may correspond in terms of, for example, allocation characteristics to one or more buffers 13 that may be allocated in the client 10.

By way of example, after NVMe controller 112 reads data 199 from storage 150 and/or mass storage 156, NVMe controller 112 may store the data 199 in one or more buffers (e.g., one or more buffers 130A) that may be associated with one or more command identifiers 302, and may send an indication to NW I/O device 108 that an access command has been completed, e.g., ringing one or more doorbells 192. Responsive to NVMe controller 112 ringing one or more doorbells 192, NW I/O device 108 may determine, based upon one or more queue phase bits 312, the one or more most recently added valid completion queue in one or more completion queues 120. NW I/O device 108 may use the one or more command identifiers 302 in one or more completion queue elements 190 to index into table 250 to locate the one or more entries (e.g., one or more entries ENTRY A) and one or more command queue elements (e.g., one or more queue elements QE A) in table 250 that may be associated with and/or identified by one or more command identifiers 302. NW I/O device 108 may execute one or more commands that may be associated with and/or embodied by these one or more command queue elements QE A. For these examples, this may result in NW I/O 108 reading one or more buffers 130A to obtain data 199, and transmitting data 199 and one or more completion queue elements 190 to NW I/O device 106 and/or client 10 (e.g., via one or more responses 197). As a result, data 199 and/or one or more completion queue elements 190 may be copied into one or more client buffers 13.

Alternatively, in some examples, NW I/O device 108 may include a state machine (not shown). This state machine may be independent and/or separate from one or more submission queues 114 that may be associated with and/or utilized by NW I/O device 108. This state machine may locate one or more command queue elements QE A in table 250 based upon one or more command identifiers 302, and may copy the one or more queue elements QE A into one or more corresponding submission queue elements 196A in one or more submission queues 126. The state machine then may signal NW I/O device 108 to access and execute one or more submission queue elements 196A in one or more submission queues 126.

Further alternatively, without departing from these examples, prior to completing one or more read operations involving storage 150 and/or mass storage 156, NVMe controller 112 may locate and/or select one or more queue elements QE A in and/or from table 250, based upon one or more command identifiers 302. NVMe controller 112 then may write into one or more completion queue elements 190 into one or more completion queues 120, and may write one or more queue elements QE A into one or more corresponding submission queue elements 196A in one or more submission queues 126. NVMe controller 112 then may ring one or more doorbells 192. This may result in NW I/O device 108 accessing and executing one or more submission queue elements 196A in one or more submission queues 126. For these examples, this may result in NW I/O device 108 reading one or more buffers 130A to obtain data 199, and transmitting data 199 and one or more completion queue elements 190 to NW I/O device 106 and/or client 10 (e.g., via one or more responses 197). As a result, data 199 and/or one or more completion queue elements 190 may be copied into one or more client buffers 13.

In this alternative example, firmware and/or one or more agents 194 executed by NW I/O device 108, NVMe controller 112 or manageability module 109 may maintain per-queue-pair context information to indicate one or more queue pairs used for RDMA transactions. This context information also may include various pointers (e.g., to one or more arrays of submission queue elements 196A . . . 196N to move data from one or more buffers 130A . . . 130N to one or more buffers 13, and/or the head of one or more submission queues 126), one or more locations of one or more doorbells 192 and one or more values to ring the one or more doorbells 192, and/or local copies of head and/or pointers to the one or more submission queues 126. Various of these pointers (e.g., the head and tail pointers) may be dynamically updated by firmware executed by NVMe controller 112.

Additionally or alternatively, without departing from these examples, NW I/O device 108, manageability module 109 and/or NVMe controller 112 may be comprised in the not shown chipset, or in a not shown circuit board or device. Also additionally or alternatively, without departing from this embodiment, storage 150 and/or mass storage 156 may be internal to server 20 or may be external to server 20.

Further although the foregoing description has been made with reference to NW I/O device 108 being an RNIC, and NVMe controller 112 being an NVMe compliant storage controller, the principles of this embodiment may be applied to circumstances in which protocols other than and/or in addition to RDMA or NVMe may be employed, and/or in which NVMe controller 112 may be involved in executing and/or facilitating operations that do not involve storage 150 (e.g., other and/or additional input/output and/or communication-related operations). Accordingly, without departing from the above mentioned examples, NW I/O device 108 may utilize, and/or communications between client 10 and server 20 may employ, protocols other than and/or in addition to RDMA. Also, without departing from this embodiment, NW I/O device 108, manageability module 109 or NVMe controller 112 may be involved in executing and/or may facilitate execution of such other and/or additional operations that may employ protocols other than PCIe or NVMe protocols. In these additional and/or alternative arrangements, hardware and/or firmware circuitry (not shown) may be included in circuitry 118 that may permit writing to doorbells 170 and/or 192 via, e.g., one or more interrupt mechanisms (e.g., one or more message signaled interrupts (MSI/MSI-X) and/or other mechanisms). This embodiment should be viewed broadly as covering all such modifications, variations, and alternatives.

Thus, in some examples, circuitry may be arranged to enable a first NW I/O device in a client to access, via a second NW I/O device in a server that is remote from the client and in a manner that is independent of an operating system environment in the server, command interface of another (e.g., storage, and/or another/additional type of) controller of the server. The NW I/O device in the client and the NW I/O device in the server may be or comprise respective remote direct memory access-enabled network interface controllers (e.g., controllers capable of utilizing and/or communicating via RDMA). The command interface may include at least one (e.g., storage, and/or other/additional type of) controller command queue. Such accessing may include writing at least one queue element to the at least one submission queue to command the another controller to perform at least one operation (e.g., involving storage, and/or involving one or more other and/or additional types of operations, such as, other and/or additional input/output operations) associated with the another controller (e.g., an NVMe controller). The other controller may perform the at least one operation in response to the at least one queue element. Many alternatives, variations, and modifications are possible. Some of these alternatives may include the use of a manageability module (e.g., manageability module 109) coupled between the NW I/O device and the NVMe controller at the server to facilitate the remote NW I/O device's access to the at least one command interface.

Thus, in some examples, the one or more command interfaces 110 of NVMe controller 112 in server 20 may be directly accessed by the client's NW I/O device 106 via one or more RDMA transactions, in a manner that by-passes, is independent of, and/or does not involve the server's OSE 32 and/or CPU 12. Advantageously, this may permit storage commands, data, and completion messages to be communicated between the client and server much more quickly and efficiently, and with reduced latency. Furthermore, in this embodiment, interactions between NW I/O device 108 and NVMe controller 112 may be carried out entirely or almost entirely by hardware (e.g., utilizing peer-to-peer memory and doorbell writes), and also in a manner that by-passes, is independent of, and/or does not involve the server's OSE 32 and/or CPU 12. Advantageously, this may permit such interactions to be carried out much more quickly and efficiently, and with reduce latency. Additionally, the above features of this embodiment may reduce the server's power consumption, heat dissipation, and the amount of bandwidth consumed by the OSE 32 and CPU 12.

Many other modifications are possible. For example, as stated previously, in this embodiment, client 10 may comprise a plurality of clients. If RDMA is employed for communications between server 20 and the clients 10, in this embodiment, advantageously, the clients 10 may dynamically share buffers 130A . . . 130N, as a common pool of buffers, between or among the client 10 in carrying out their communications with server 20, NW I/O device 108, and/or NVMe controller 112. In order to permit such buffer sharing, NW I/O device 108 may be capable of manipulating, adjusting, and/or modifying buffer-specifying information that may be indicated in commands 105 provided to the server 20 by the clients 10 in order to allow the buffers 130A . . . 130N and/or other server resources to be shared among the clients 10 without resulting in, for example, contention-related issues.

For example, the one or more indicators 181 and/or STags indicated by the one or more indicators 181 may include respective information that NW I/O device 108 may associate with one or more buffers and/or buffer pools in the buffers 130A . . . 130N, instead of and/or in addition to one or more memory region handles. In this arrangement, the clients 10 may perform RDMA read operations utilizing such indicators 181 and NW I/O device 108 may perform write operations to the one or more buffers and/or buffer pools indicated by the respective information and/or indicators 181. In carrying out its operations, NW I/O device 108 may appropriately adjust the actual commands and/or command queue elements provided to NVMe controller 112 in order to result in the correct buffers, etc. being written to by NVMe controller 112 when NVMe controller 112 carries out such commands and/or command queue elements.

Alternatively or additionally, without departing from the above examples, NW I/O device 108 may include and/or be associated with a shared receive queue (not shown) to receive, for example, commands 105 from multiple clients 10. NW I/O device 108 may be capable of substituting one or more appropriate server buffer addresses, values, and/or other information into one or more portions (e.g., queue elements 116, values 201, indicators 181, and/or other information) of the received commands 105 to permit sharing of the structures in the one or more command interfaces 110 between or among multiple clients 10, without resulting in contention or other degradation in performance. In this arrangement, the clients may not be provided and/or utilize one or more STags to the storage controller's command queue and/or doorbell, and writing to these structures may be performed by the server's NW I/O device 108. Advantageously, this may permit multiple clients 10 that may be associated with and/or utilize the shared receive queue to utilize and/or share the same storage controller command queue, doorbell, and/or other structures.

For example, in the case of a write operation, one or more indicators 181, one or more values 201, and/or other information in one or more commands 105 may indicate one or more storage controller STags for the write operation (and related information), and/or one or more RDMA STags to one or more buffers to which one or more completion queue elements may be written. For these examples, based upon the one or more received commands 105 and/or other information stored in NW I/O device 108, NW I/O device 108 may select one or more buffers in buffers 130A . . . 130N and one or more locations in the submission queue 114 to which to post the data 199 to be written and one or more corresponding command queue elements to be forwarded to submission queue 126 associated with NVMe controller 112. NW I/O device 108 may post the data 199 and the one or more corresponding command queue elements in accordance with such selections, and thereafter, may ring doorbell 170. As posted by NW I/O device 108, the one or more command queue elements may indicate the one or more storage controller STags supplied in the one or more commands 105, command identifier 302, security context information (e.g., to permit validation of the one or more storage controller STags), and/or one or more STags to the one or more buffers to which data 199 has been posted. After NVMe controller 112 has completed the requested one or more write operations and posted one or more completion queue elements (e.g., to completion queue 124), NVMe controller 112 may ring doorbell 192. Based upon information in table 250, NW I/O device 108 may generate and forward to the one or more clients that provided the received command 105 one or more appropriate responses 197 via forwarding the completion queue elements from completion queue 124 to completion queue 120.

In the case of a read operation, generally analogous information may be provided in command 105 and generally analogous operations may be performed by NW I/O device 108 and/or NVMe controller 112. However, in the case of a read operation, the data 199 read by NVMe controller 112 may be stored by NVMe controller 112 to one or more of the buffers 130A . . . 130N specified by the NW I/O device 108, and may be read by the NW I/O device 108, instead of vice versa (e.g., as may be the case in a write operation). NW I/O device 108 may transmit the read data 199 to the one or more clients that provided the received command 105 in one or more responses 197. In the foregoing arrangement, command 105 may be similar or identical to a command that may be utilized by a client to access storage local to the client, at least from the vantage point of one or more client-executed applications initiating such access. Advantageously, this may permit remote operations and/or RDMA transactions of the types previously described to be substantially transparent to these one or more client-executed applications.

Thus, in some examples, advantageously, it may be possible for multiple clients to share the storage controller's command queue, doorbells, and/or the server's buffers, and/or to write to these structures (via the server's NW I/O device) using an RDMA protocol, without suffering from resource contention issues (and/or other disadvantages) that might otherwise occur. The server's NW I/O device may be capable of modifying information associated with and/or comprised in the clients' commands 105 to facilitate such sharing and/or sharing of RDMA STag information between or among the clients. Advantageously, this may permit RDMA protocol to be employed for command communication and/or completion information between the server and multiple clients, with improved scalability, while reducing the memory consumption to implement such features, and without degradation in communication line rate.

Figure 3:
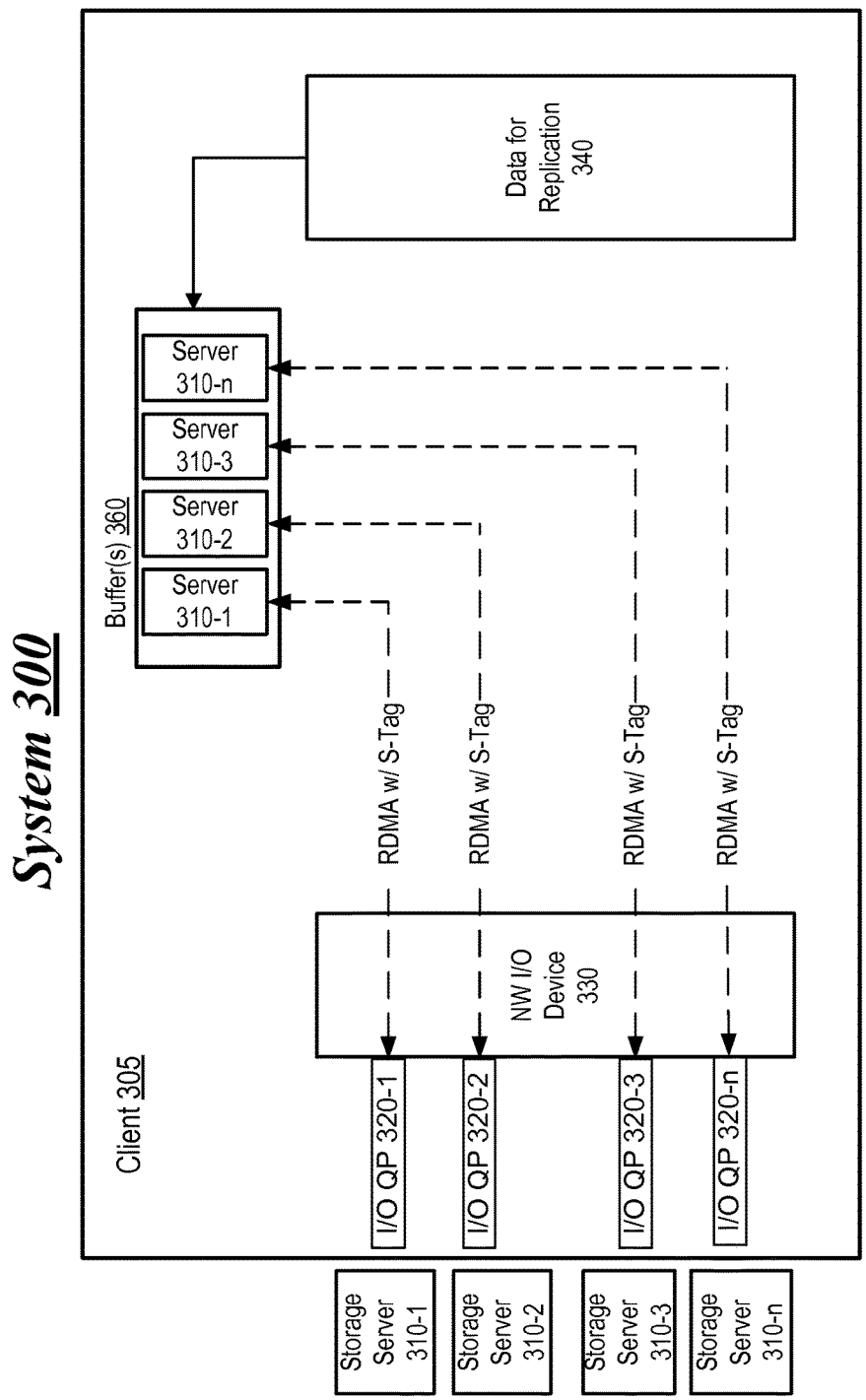
FIG. 3 illustrates a second example system.

FIG. 3 illustrates a second example system. As shown in FIG. 3, the second example system includes a system 300. According to some examples, system 300 may include multiple storage nodes or storage servers 310-1 to 310-n (where "n" represents any positive integer greater than 3) and a client 305. For these examples, a NW I/O device 330 or buffer(s) 360 may be located, maintained at or coupled with client 305. Also, as shown in FIG. 3, data for replication 340 may be at temporarily stored at client 305 and/or generated by logic and/or features such as applications executed by circuitry of client 305 (not shown).

In some examples, logic and/or features executed by circuitry for either network I/O device 330 and/or client 305 may allocate resources to storage servers 310-1 to 310-n to facilitate replication of data included in data for replication 340. For these examples, separate I/O queue pairs (QPs) 320-1 to 320-n may be allocated or assigned to storage servers 310-1 to 310-n, respectively. Also, at least portions of buffer(s) 360 may be allocated or assigned to servers 310-1 to 310-n. According to some examples, I/O QPs 320-1 to 320-n and/or buffer(s) 360 may be part of system memory resident at client 305 (not shown). Alternatively, I/O QPs 320-1 to 320-n may be maintained at or with NW I/O device 330.

According to some examples, I/O QPs 320-1 to 320-n may separately include both command submission queues and command completion queues utilized by logic and/or features at NW I/O device 330 to exchange information with storage servers 310-1 to 310-n regarding RDMA commands or requests associated with RDMA commands to replicate data included in data for replication 340. For these examples, data for replication 340 may also include appropriate error correction codes/checksums to replicate the included data.

In some examples, logic and/or features executed by circuitry at NW I/O device 330 may be capable of sending an RDMA command message to store data for replication 340 at servers 310-1 to 310-n. As described more below, the RDMA command message may be sent to one or more storage servers from among storage servers 310-1 to 310-n via at least one network connection between the one or more storage servers and client 305. The logic and/or features at NW I/O device 330 may also receive one or more RDMA command completion messages from the one or more storage servers that indicate replication of the data between at least two of the servers from among storage servers 310-1 to 310-n.

According to some examples, I/O QPs 320-1 to 320-n may be maintained at NW I/O device 330. For these examples, I/O QPs 320-1 to 320-n may be in a memory maintained at NW I/O device 330 that includes at least one of a non-volatile memory or a volatile memory. The memory maintained at NW I/O device 330 may be capable of at least temporarily storing information associated with the storage of data included in data for replication 340 at one or more of storage servers 310-1 to 310-n. The information may include one or more RDMA STags. In some examples, respective STags for each of the storage servers may have been pre-assigned to client 305 and may indicate an amount or portion of storage capacity pre-assigned to client 305 for respective storage devices controlled by NVMe controllers maintained at these storage servers.

Figure 4:
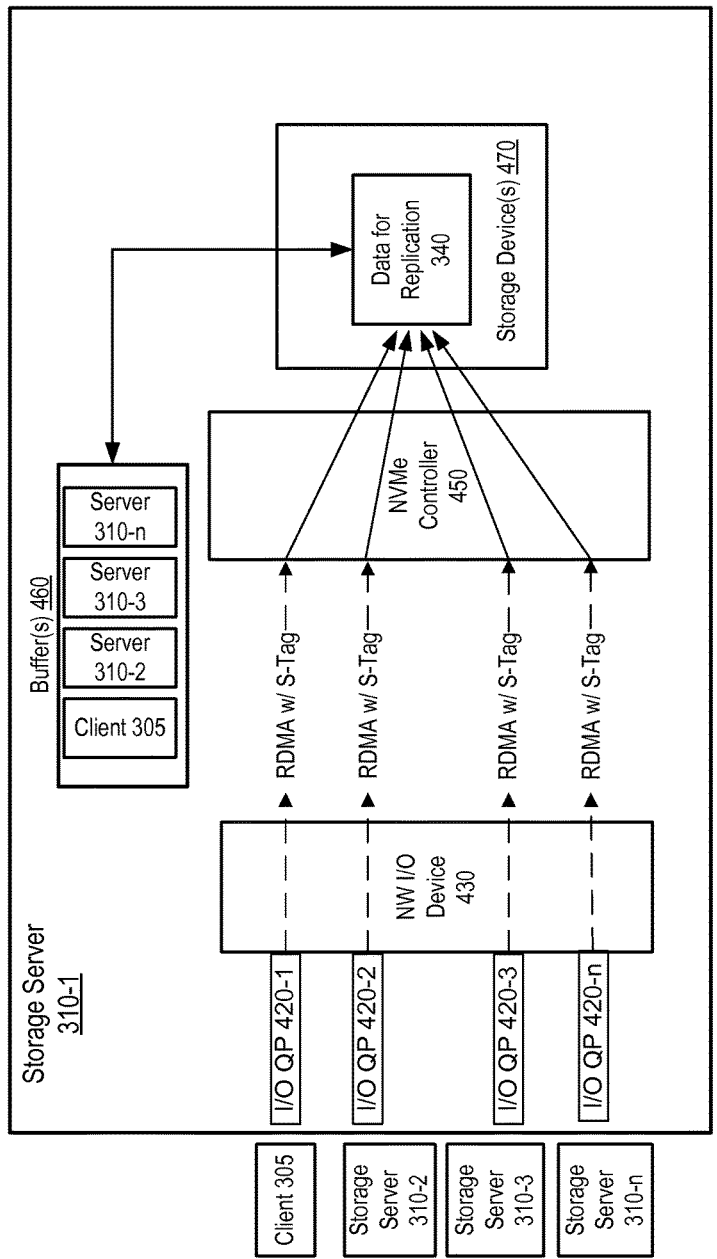
FIG. 4 illustrates a third example system.

FIG. 4 illustrates a third example system. As shown in FIG. 4, the third example system includes a system 400. According to some examples, system 400 may include storage server 310-1 coupled to client 305 and storage servers 310-2 to 310-n. For these examples, a NW I/O device 430, an NVMe controller 450, buffer(s) 460 or storage device(s) 470 may be located, maintained at or coupled with storage server 310-1. Also, as shown in FIG. 4, storage device(s) 470 may include data for replication 340 that may include data replicated and/or stored from client 305.

In some examples, logic and/or features executed by circuitry for either network I/O device 430 and/or server 310-1 may allocate resources to client 305 and/or storage servers 310-2 to 310-n to facilitate remote access to storage device(s) 470 controlled by or accessible through NVMe controller 450. For these examples, separate I/O QPs 420-1 to 420-n may be allocated or assigned to client 305 and storage servers 310-2 to 310-n, respectively. Also, at least portions of buffer(s) 460 may be allocated or assigned to client 305 and storage servers 310-1 to 310-n. According to some examples, I/O QPs 420-1 to 420-n and/or buffer(s) 460 may be part of system memory resident at storage server 310-1 that may be separately managed or part of a separate system memory maintained at storage server 310-1 (not shown). Alternatively, I/O QPs 420-1 to 420-n may be maintained at or with NW I/O device 430.

According to some examples, similar to system 300 for FIG. 3, I/O QPs 420-1 to 420-n may separately include both command submission queues and command completion queues utilized by logic and/or features at NW I/O device 430 to receive/forward RDMA commands/command completions with client 305 and/or storage servers 310-2 to 310-n regarding RDMA commands or requests associated with RDMA commands to replicate data included in data for replication 340.

In some examples, as described more below, logic and/or features executed by circuitry at NW I/O device 430 may receive an RDMA command from a client such as client 305 that includes an STag. As described more below, the STag may have been pre-assigned to client 305 by storage server 310-1 software (not shown) and may indicate an amount or portion of storage capacity for storage device(s) 470 that has been allocated to client 305 and/or allocated for storage of data for replication 340. For these examples, the RDMA command may be to replicate data received/obtained from client 305 in data for replication 340 and store the received/obtained data in storage device(s) 470 controlled and/or accessible through NVMe controller 450. The logic and/or features at NW I/O device 430 may forward the RDMA command with the STag to NVMe controller 450. According to some examples, NVMe controller 450 may store the data included in data for replication 340 to the allocated portions of storage device(s) 470 based on an association scheme that associates the STag included in the RDMA command to the allocated portion.

According to some examples, once the data included in data for replication 340 has been stored to the allocated portions of storage device(s) 470, NVMe controller 450 may generate an RDMA command completion message. For these examples, logic and/or features at NW I/O device 430 may be capable of forwarding the RDMA command completion message to client 305 to indicate the storing of the data included in data for replication 340.

In some examples, the logic and/or features at NW I/O device 430 may also receive another RDMA command from a storage server such as storage server 310-2. This other RDMA command may also include an STag. For these examples, the STag may be the same STag that was pre-assigned by storage server 310-1 software (not shown) and may indicate an amount or portion of storage capacity for storage device(s) 470 that has been allocated to client 305-1 and/or allocated for storage of data for replication 340. For these examples, the other RDMA command may be to replicate data in data for replication 340 and store the replicated data at storage server 310-2. The logic and/or features at NW I/O device 430 may forward the other RDMA command with the STag to NVMe controller 450. According to some examples, NVMe controller 450 may than cause the data included in data for replication 340 to be readable by logic and/or features of storage server 310-2 to enable storage server 310-2 to replicate the data via storing the data to one or more storage devices controlled by another NVMe controller maintained at storage server 310-2.

According to some examples, the other RDMA command may have been received in response to a request message sent to storage server 310-2 to have storage server 310-2 replicate data for replication 340. For these examples, the request may have been sent by logic and/or features of client 305. Alternatively, the request may have been sent by logic and/or features of storage server 310-1.

According to some examples, I/O QPs 420-1 to 420-n may be maintained at NW I/O device 430. For these examples, I/O QPs 420-1 to 420-n may be in a memory maintained at NW I/O device 430 that includes at least one of a non-volatile memory or a volatile memory. The memory maintained at NW I/O device 430 may be capable of at least temporarily storing information associated with the storage of data include in data for replication 340 at storage server 310-1 and/or at one or more storage servers 310-2 to 310-n. The information may include one or more RDMA STags. In some examples, at least one RDMA STag from among the one or more RDMA STags may be included in the other RDMA command message forwarded to NVMe controller 450 to cause the data included in data for replication 340 to be readable by logic and/or features at storage server 310-2.

Figure 5:
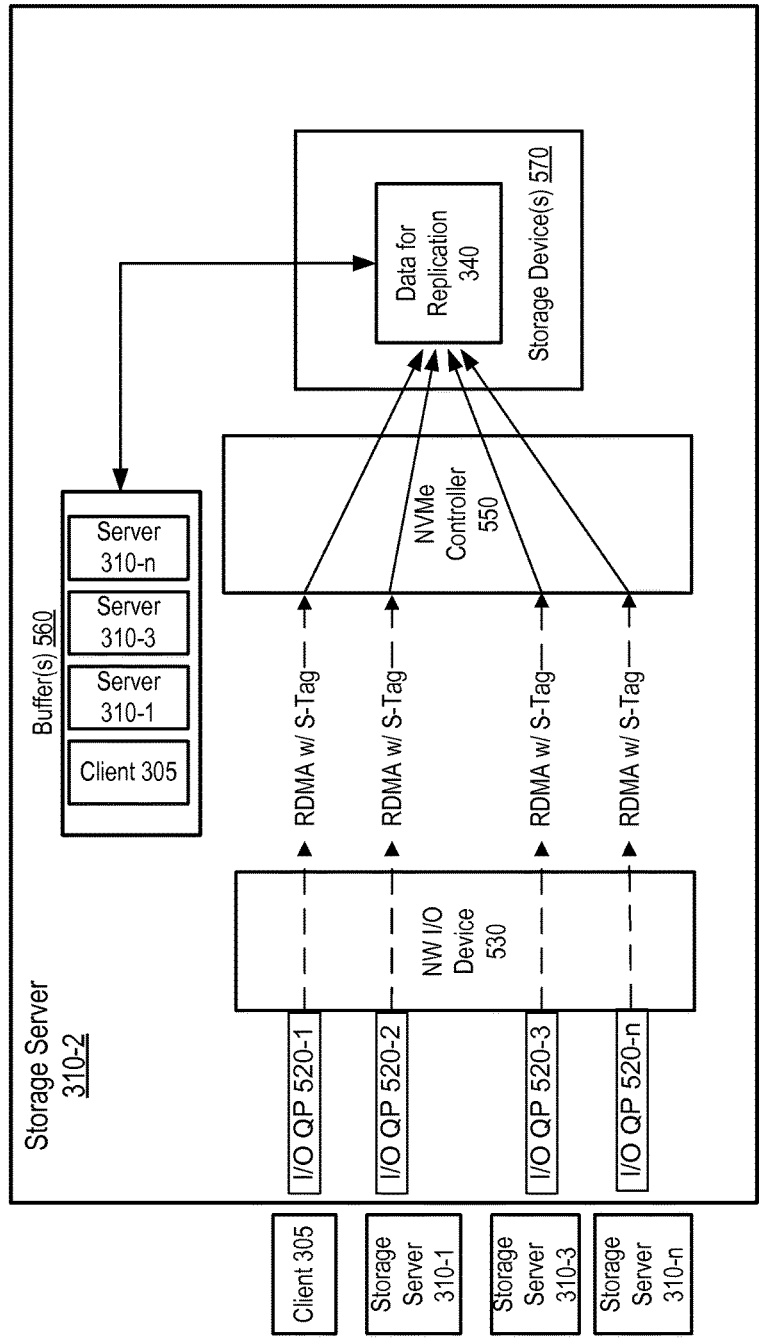
FIG. 5 illustrates a fourth example system.

FIG. 5 illustrates a fourth example system. As shown in FIG. 5, the fourth example system includes a system 500. According to some examples, system 500 may include storage server 310-2 coupled to client 305, storage server 310-1 and storage servers 310-3 to 310-n. For these examples, a NW I/O device 530, an NVMe controller 550, buffer(s) 560 or storage device(s) 570 may be located, maintained at or coupled with storage server 310-2. Also, as shown in FIG. 5, storage device(s) 570 may include data for replication 340 that may include data replicated from either client 305 or another storage server such as storage server 310-1.

In some examples, logic and/or features executed by circuitry for either network I/O device 530 and/or server 310-2 may allocate resources to client 305 and/or storage servers 310-1 or 310-3 to 310-n to facilitate remote access to storage device(s) 570 controlled by or accessible through NVMe controller 550. For these examples, separate I/O QPs 520-1 to 520-n may be allocated or assigned to client 305 and storage servers 310-1, 310-3 to 310-n, respectively. Also, at least portions of buffer(s) 560 may be allocated or assigned to client 305 and storage servers 310-1, 310-3 to 310-n. According to some examples, I/O QPs 520-1 to 520-n and/or buffer(s) 560 may be part of system memory resident at storage server 310-2 that may be separately managed or part of a separate system memory maintained at storage server 310-2 (not shown). Alternatively, I/O QPs 520-1 to 520-n may be maintained at or with NW I/O device 530.

According to some examples, similar to systems 300 or 400 for FIG. 3 or 4, I/O QPs 520-1 to 520-n may separately include both command submission queues and command completion queues utilized by logic and/or features at NW I/O device 530 to receive/forward RDMA commands/command completions with client 305 and/or storage servers 310-1 or 310-3 to 310-n regarding RDMA commands or requests associated with RDMA commands to replicate data included in data for replication 340.

In some examples, similar to NW I/O 430 for storage server 310-1, logic and/or features executed by circuitry at NW I/O device 530 may receive an RDMA command from either a client such as client 305 or a storage server such as storage server 310-1 that includes an STag. The STag may have been pre-assigned to client 305 or storage server 310-1 by storage server 310-2 software (not shown) and may indicate an amount or portion of storage capacity for storage device(s) 570 that has been allocated to client 305 and/or allocated for storage of data for replication 340. For these examples, the RDMA command may be to replicate data received/obtained from client 305 or storage server 310-1 in data for replication 340 and store the received/obtained data in storage device(s) 570 controlled and/or accessible through NVMe controller 550. The logic and/or features at NW I/O device 530 may forward the RDMA command with the STag to NVMe controller 550. According to some examples, NVMe controller 550 may store the data included in data for replication 340 to the allocated portion of storage device(s)

570 based on an association scheme that associates the STag included in the RDMA command to the allocated portion.

According to some examples, once the data included in data for replication 340 has been stored to the allocated portions of storage device(s) 570, NVMe controller 550 may generate an RDMA command completion message. For these examples, logic and/or features at NW I/O device 530 may be capable of forwarding the RDMA command completion message to the source of the received RDMA command be it client 305 or storage server 310-1 to indicate the storing of the data included in data for replication 340.

Figure 6:
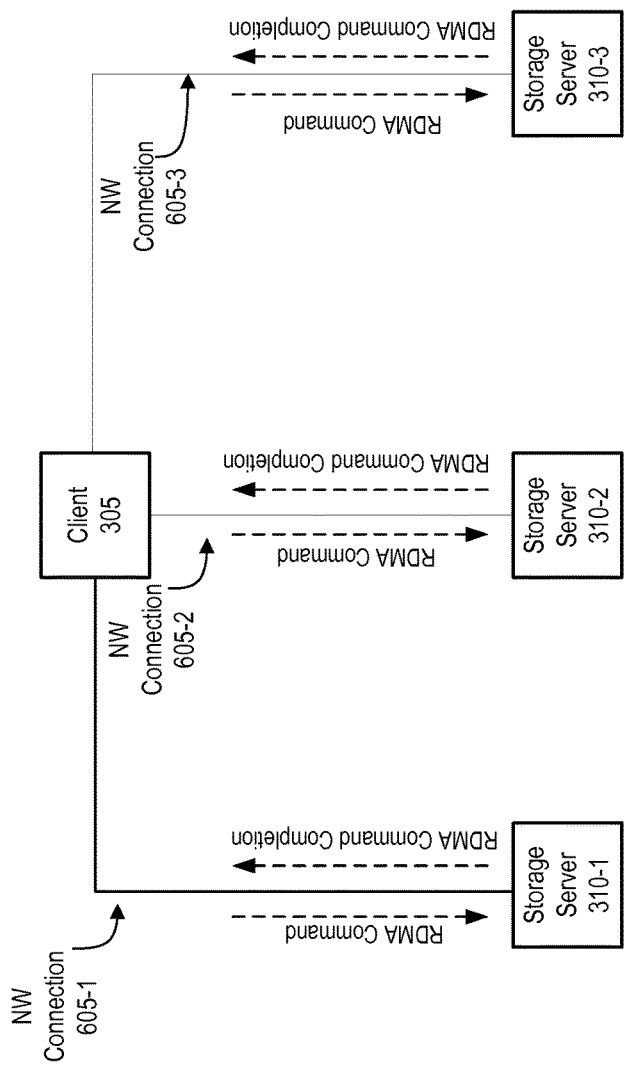
FIG. 6 illustrates a fifth example system.

FIG. 6 illustrates a fifth example system. As shown in FIG. 6, the fifth example system includes a system 600. According to some examples, system 600 may include client 305 coupled to storage servers 310-1, 310-2 and 310-3 via network (NW) connections 605-1, 605-2 and 605-3, respectively. In some examples, NW connections 605-1 to 605-3 may be routed through a network (not shown) such as a local access network (LAN) via one or more types of wired or wireless communication mediums. The one or more types of wired or wireless communication mediums, for example, may be configured to allow client 305 to exchange RDMA messages with servers 310-1 to 310-3 that are compliant with a protocol to include, but not limited to, iWARP, Infiniband or RoCE.

In some examples, logic and/or features at client 305 may send separate RDMA command messages to storage servers 310-1 and 310-2 via respective NW connections 605-1 605-2. The separate RDMA messages may be to store data for replication. For these examples, logic and/or features at storage servers 310-1 and 310-2 such as the logic and/or features described above for FIGS. 4 and 5 may cause the data to be replicated via storing of the data at storage devices 470 or 570 controlled by respective NVMe controllers 450 and 550 maintained at the each of these storage servers. Storage servers 310-1 and 310-2 may then separately send RDMA command completion messages to client 305 that indicate replication of the data between at least storage servers 310-1 and 310-2.

According to some examples, another RDMA command message may be sent to storage server 310-3 via NW connection 605-3. The other RDMA command message may be to store error correction or data recovery information associated with the data replicated or stored at storage servers 310-1 and 310-2. For these examples, logic and/or features at storage server 310-3 may store the error correction or data recovery information at storage device(s) controlled by an NVMe controller maintained at storage server 310-3. The logic and/or features at storage sever 310-3 may then send an RDMA command completion message to client 305 to indicate storage of the error correction or data recovery information. In some examples, the error correction or data recovery information may be used to correct one or more errors in the replicated data stored by servers 310-1 or 310-2 or to recover at least portions of the replicated data.

Figure 7:
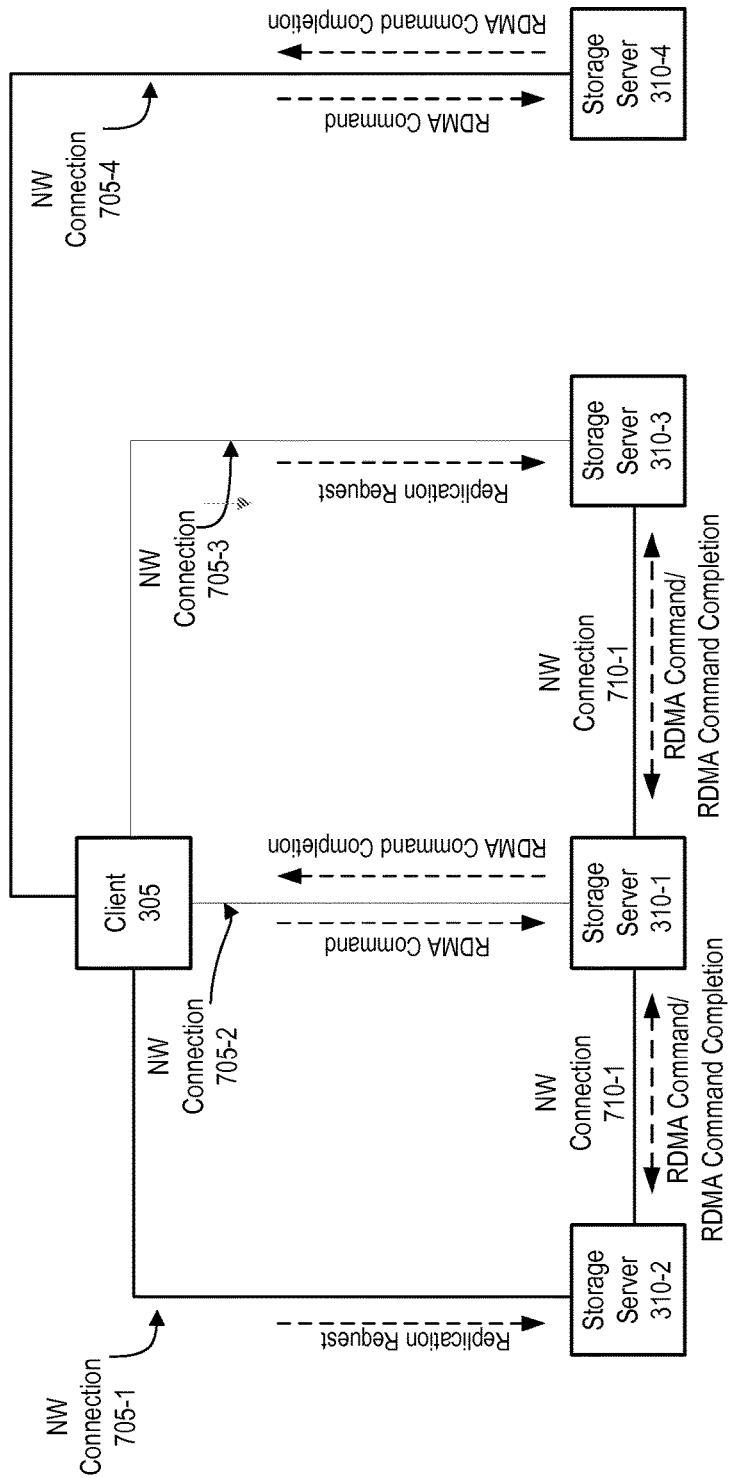
FIG. 7 illustrates a sixth example system.

FIG. 7 illustrates a sixth example system. As shown in FIG. 7, the sixth example system includes a system 700. According to some examples, system 700 may include client 305 coupled to storage servers 310-1, 310-2, 310-3 and 310-4 via NW connections 705-1, 705-2, 705-3 and 705-4, respectively. In some examples, similar to NW connections 605-1 to 605-3 for FIG. 6, NW connections 705-1 to 705-4 may be routed through a network such as a LAN via one or more types of wired or wireless communication mediums. The one or more types of wired or wireless communication mediums, for example, may also be configured to allow client 305 to exchange RDMA messages with servers 310-1 to 310-4 that are compliant with a protocol to include, but not limited to, iWARP, Infiniband or RoCE.

In some examples, logic and/or features at client 305 may send an RDMA command message to storage server 310-1 via NW connections 705-2. The first RDMA message may be to store data for replication 340 at storage server 310-1. For these examples, logic and/or features at storage server 310-1 such as the logic and/or features described above for FIG. 4 may cause the data included in data for replication 340 to be stored at storage device(s) 470 controlled by NVMe controller 450 maintained at storage server 310-1. Storage server 310-1 may then send an RDMA command completion message to client 305 that indicates at least storage of data for replication 340 at storage device(s) 470.

According to some examples, logic and/or features at client 305 may send or push the data included in data for replication 340 via NW connection 705-2 to one or more buffers maintained at storage server 310-1 such as buffer(s) 460. The logic and/or features at client 305 may then indicate the location for the data in the first RDMA message. For these examples, NVMe controller 450 at storage server 310-1 may be capable of causing the RDMA command completion message to be sent to client 305 based on reading the data from the one or more buffers and storing this data in storage device(s) 470. In some examples, the data for replication 340 may be stored in an allocated portion of storage device(s) 470 associated with an STag included in the first RDMA message sent by client 305.

In some other examples, logic and/or features at client 305 may send the data included in data for replication 340 to one or more buffers maintained at client 305 such as buffer(s) 360. The logic and/or features at client 305 may then indicate the location for the data in the first RDMA message. For these examples, NW I/O device 430 at storage server 310-1 may be capable of pulling the data via NW connection 705-2 from the buffer(s) 360. The pulled data may then be at least temporarily stored to buffer(s) 460 at storage server 310-1. NVMe controller 450 at storage server 310-1 may then cause the RDMA command completion message to be sent to client 305 based on reading the data from buffer(s) 460 and storing this data to storage device(s) 470. In some examples, data for replication 340 may be stored in an allocated portion of storage device(s) 470 associated with an STag included in the first RDMA message sent by client 305.

In some examples, a second RDMA command message may be sent by logic and/or features of client 305 to storage server 310-4 via NW connection 705-4. The second RDMA command message may be to store error correction or data recovery information associated with the data for replication 340 that was stored at storage server 310-1. For these examples, logic and/or features at storage server 310-4 may store the error correction or data recovery information at storage device(s) controlled by an NVMe controller maintained at storage server 310-3. The logic and/or features at storage server 310-3 may then send an RDMA command completion message to client 305 to indicate storage of the error correction or data recovery information. In some examples, the error correction or data recovery information may be used to correct one or more errors in data for replication 340 stored at server 310-1 and also stored at storage server 310-2 (described more below) or to recover at least portions of the replicated data.

According to some examples, logic and/or features at client 305, after receiving the RDMA command completion message from storage server 310-1 indicating storage of data for replication 340, may send separate replication request messages to storage servers 310-2 and 310-3 via respective NW connections 705-1 and 705-3. For these examples, logic and/or features at storage servers 310-2 and 310-3 may each send RDMA command messages to storage server 310-1 responsive to their respective replication request messages from client 305. The separate RDMA command messages may be to replicate data included in data for replication 340 stored at storage device(s) 470 controlled by NVMe controller 450. The separate RDMA command messages may each be forwarded to NVMe controller 450 to cause data for replication 340 stored in storage device 470 to be readable by storage servers 310-2 and 310-3.

In some examples, the separate RDMA command messages may each include one or more RDMA STags to indicate a location for the data for replication 340 stored at storage device(s) 470. For these examples, respective NW I/O devices at storage servers 310-2 and 310-3 may be capable of pulling data via NW connections 710-1 and 710-2 included in data for replication 340 using the one or more RDMA STags. Also, NVMe controllers at these storage servers may also be capable of storing the pulled data to storage device(s) controlled by these NVMe controllers in order to replicate the data included in data for replication 340. Once the data has been replicated, storage servers 310-2 and 310-3 may send separate RDMA command completion messages to storage server 310-1 to indicate successful replication of the data. Replication may include computing various types of error recovery codes by replicating servers to include, but not limited to, a Reed Solomon error recovery code set.

According to some other examples, the separate RDMA command messages may each include one or more RDMA STags to indicate a location for data included in data for replication 340 stored at storage device(s) 470 that has been pushed via NW connections 710-1 and 710-2 to one or more buffers at each of storage servers 310-2 and 310-3. For these other examples, respective NVMe controllers at these storage servers may be capable of reading the data pushed to the one or more buffers and storing the data to storage device(s) controlled by these NVMe controllers in order to replicate the data included in data for replication 340. Once the data has been replicated, storage servers 310-2 and 310-3 may send separate RDMA command completion messages to storage server 310-1 to indicate successful replication of the data.

Figure 8:
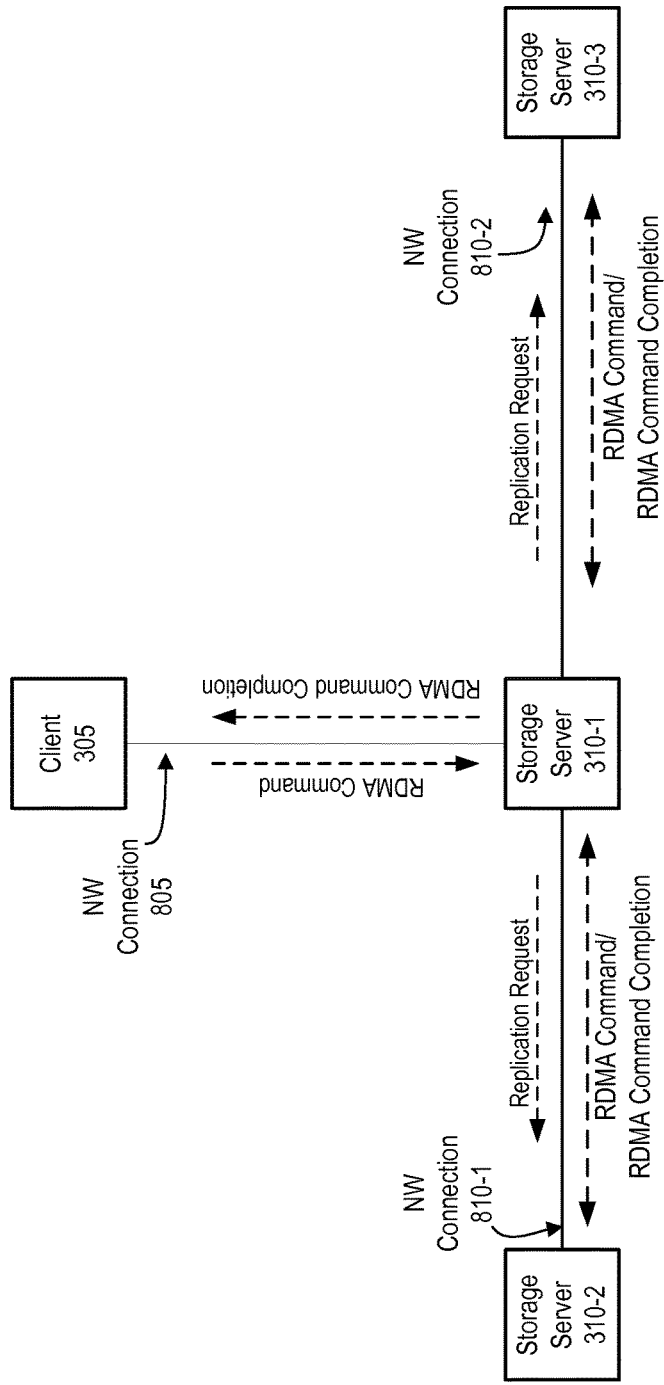
FIG. 8 illustrates a seventh example system.

FIG. 8 illustrates a seventh example system. As shown in FIG. 8, the seventh example system includes a system 800. According to some examples, system 800 may include client 305 coupled to storage server 310-1 via NW connection 805. Also, as shown in FIG. 8, storage server 310-1 may be coupled to storage servers 310-2 and 310-3 via NW connections 810-1 and 810-2, respectively. In some examples, NW connection 805 may be routed through a network (not shown) such as a LAN via one or more types of wired or wireless communication mediums. Also, NW connections 810-1 and 810-2 may be routed through the same or a different network via one or more types of wired or wireless communication mediums. The one or more types of wired or wireless communication mediums, for example, may be configured to allow client 305 to exchange RDMA messages with servers 310-1 or server 310-1 to exchange RDMA messages with storage servers 310-2 or 310-3. These exchanged RDMA messages may be compliant with a protocol to include, but not limited to, iWARP, Infiniband or RoCE.

In some examples, logic and/or features at client 305 may send an RDMA command message to storage server 310-1 via NW connections 805. The RDMA message may be destined for NVMe controller 450 to store data for replication 340 at storage device(s) 470. For these examples, logic and/or features at storage server 310-1 such as NW I/O device 430 and/or NVMe controller 450 may read data included in data for replication 340 from client 305 responsive to the RDMA message and cause the data to be stored to an allocated portion of storage device(s) 470. NVMe controller 450 may also send separate request messages to storage servers 310-2 and 310-3 via respective NW connections 810-1 and 810-2 to have these storage servers replicate the data stored to the allocated portions of storage device(s) 470. Logic and/or features of storage servers 310-2 and 310-3 may replicate the data included in data for replication 340 and then send separate RDMA command completion messages to storage server 310-1 to indicate successful replication. According to some examples, NVMe controller 450 may then cause an RDMA command completion message to be sent to client 305 to indicate that data for replication 340 has been successfully replicated to storage servers 310-1 to 310-3.

Figure 9:
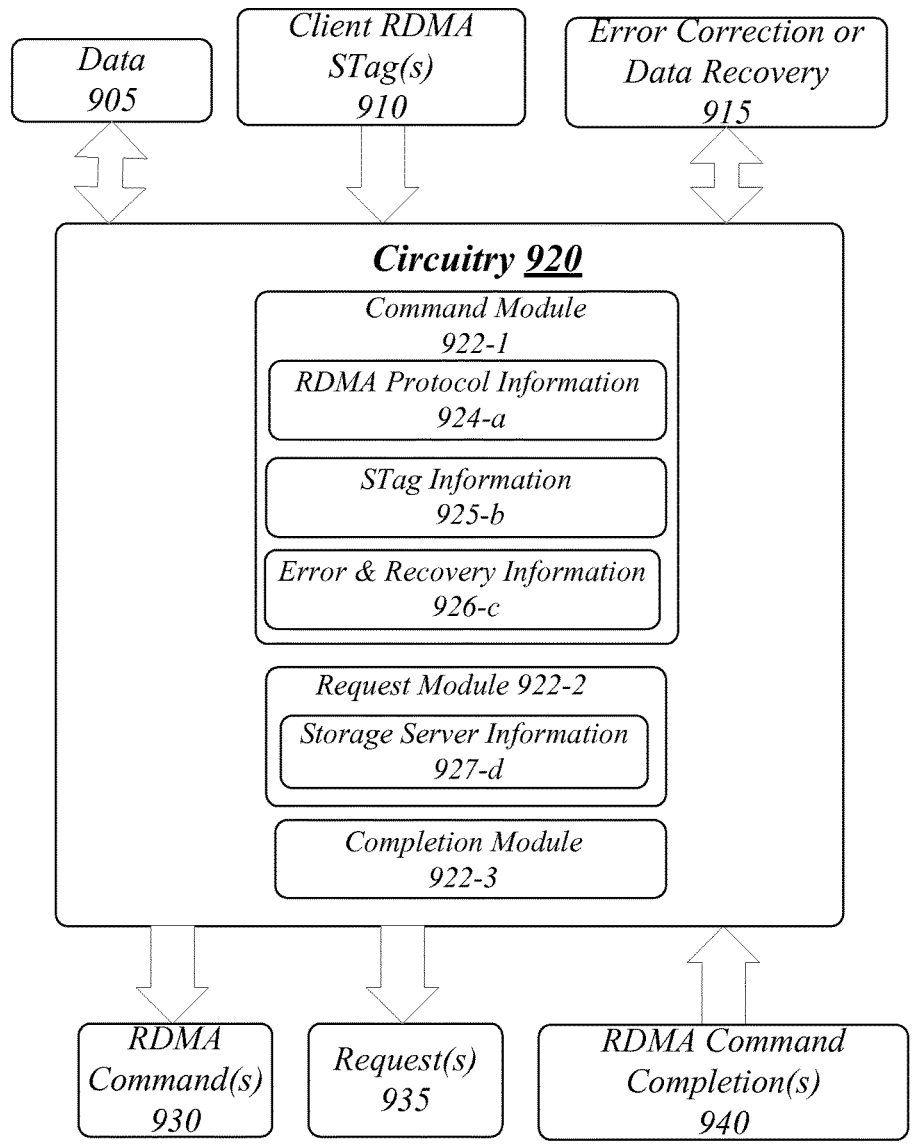
FIG. 9 illustrates an example block diagram for a first apparatus.

FIG. 9 illustrates an example block diagram of a first apparatus. As shown in FIG. 9, the first apparatus includes apparatus 900. Although apparatus 900 shown in FIG. 9 has a limited number of elements in a certain topology, it may be appreciated that the apparatus 900 may include more or less elements in alternate topologies as desired for a given implementation.

The apparatus 900 may be supported by circuitry 920 maintained at a NW I/O device coupled to a client (e.g., client 305). Circuitry 920 may be arranged to execute one or more software or firmware implemented components or modules 922-*a*. It is worthy to note that "a" and "b" and "c" and similar designators as used herein are intended to be variables representing any positive integer. Thus, for example, if an implementation sets a value for a=3, then a complete set of software or firmware for modules 922-*a* may include modules 922-1, 922-2 or 922-3. The examples presented are not limited in this context and the different variables used throughout may represent the same or different integer values.

According to some examples, circuitry 920 may include a processor or processor circuitry. The processor or processor circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 920 may also be an application specific integrated circuit (ASIC) and at least some modules 922-*a* may be implemented as hardware elements of the ASIC.

According to some examples, apparatus 900 may include a command module 922-1 for execution by circuitry 920. Command module 922-1 may be capable of sending RDMA command(s) to store data included in data 905 that may be replicated at a plurality of storage servers and to also store error correction or data recovery information included in error correction or data recovery 915 to a storage server to correct or recover from possible errors associated with replicating the data to the plurality of servers.

In some examples, command module 922-1 may be capable of at least temporarily storing RDMA protocol information 924-*a*, STag information 925-*b* (e.g., in a data structure such as a lookup table (LUT) or a non-volatile memory) to facilitate the sending of RDMA command to the storage servers. For these examples, RDMA protocol information 924-a may be based on at least one of the protocols associated with, iWARP, Infiniband or RoCE. Also, for these examples, STag information 925-b may include RDMA STag(s) that indicate allocated portion of storage at the plurality of storage servers. The RDMA STag(s) may have been received via client RDMA STag(s) 910 sent either by software at the client coupled to apparatus 900 or by software at the plurality of storage servers.

In some examples, apparatus 900 may also include a request module 922-2 for execution by circuitry 920. Request module 922-2 may be capable of sending request message(s) to at least some of the plurality of storage servers to replicate data stored to at least one of the plurality of servers. Request module 922-2 may be capable of at least temporarily storing storage server information 927-d (e.g., in (LUT) to facilitate sending the request(s) 935 that may include the request messages to replicate the data.

In some examples, apparatus 900 may also include a completion module 922-3 for execution by circuitry 920. Completion module 922-3 may be capable of receiving one or more RDMA command completion messages included in RDMA command completion(s) 940. For these examples, RDMA command completion(s) 940 may be received from one or more of storage servers from among the plurality of storage servers that may indicate replication of data 905 between at least a first storage server and a second storage server from among the plurality of storage servers.

According to some examples, RDMA command(s) 930, request(s) 935 and RDMA command completion(s) 940 may be exchanged between a client having apparatus 900 and the plurality of storage servers as described above for systems 600, 700 or 800 in FIGS. 6-8. Examples are not limited in this context.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The examples are not limited in this context.

FIG. 10 illustrates an example of a first logic flow. As shown in FIG. 10, the first logic flow includes logic flow 1000. Logic flow 1000 may be representative of some or all of the operations executed by one or more logic, features, or devices described herein, such as apparatus 900. More particularly, logic flow 1000 may be implemented by command module 922-1, request module 922-2 or completion module 922-3.

According to some examples, logic flow 1000 at block 1002 may include sending an RDMA command message to store data for replication at a plurality of storage servers. The RDMA command message may be sent to one or more storage servers from among the plurality of storage servers via at least one network connection between the one or more storage servers and a client device. For these examples, command module 922-1 for an apparatus 900 include in a client device may send the RDMA command message to store data 905 for replication at the plurality of storage servers.

In some examples, logic flow 1000 at block 1004 may receive one or more RDMA command completion messages from the one or more storage servers to indicate replication of the data between at least a first storage server and a second storage server from among the plurality of storage servers. For these examples, completion module 922-3 may receive the one or more RDMA command completion messages included in RDMA command completion(s) 940 to indicate replication of data 905 at the first and second storage servers.

In some examples, command module 922-1 and/or completion module 922-3 may use RDMA protocol information 924-a to send or receive messages compliant with such protocols as iWARP, Infiniband or RoCE.

Figure 11:
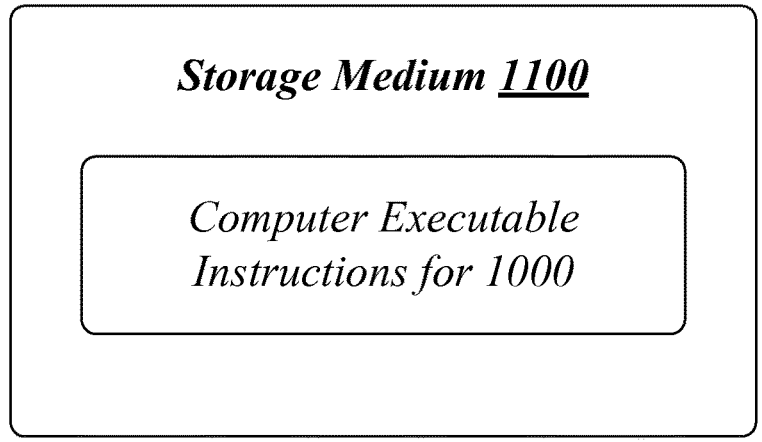
FIG. 11 illustrates an example of a first storage medium.

FIG. 11 illustrates an example of a first storage medium. As shown in FIG. 11, the first storage medium includes storage medium 1100. Storage medium 1100 may comprise an article of manufacture. In some examples, storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
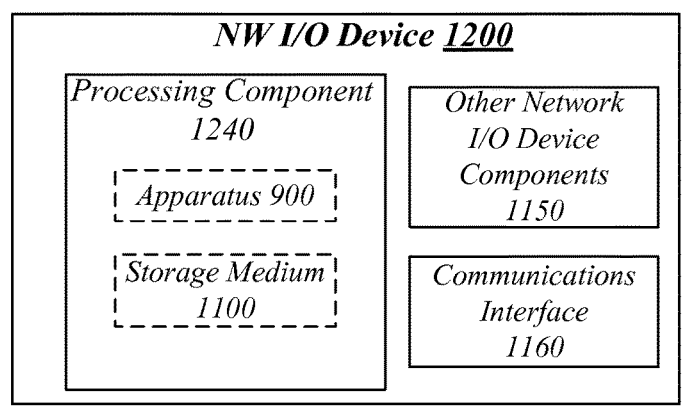
FIG. 12 illustrates an example of a first network input/output device.

FIG. 12 illustrates an example NW I/O device 1200. In some examples, as shown in FIG. 12, NW I/O device 1200 may include a processing component 1240, other platform components 1260. According to some examples, NW I/O device 1200 may be implemented in a NW I/O device coupled to a client device as mentioned above.

According to some examples, processing component 1240 may execute processing operations or logic for apparatus 900 and/or storage medium 1100. Processing component 1240 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1250 may include common computing elements, such as one or more processors, multi-core processors, co-processors, memory units, chipsets, controllers, peripherals, interfaces, oscillators, timing devices, and so forth. Examples of memory units may include without limitation various types of computer readable and machine readable storage media in the form of one or more higher speed memory units, such as ROM, RAM, DRAM, DDRAM, SDRAM, SRAM, PROM, EPROM, EEPROM, flash memory or any other type of storage media suitable for storing information.

In some examples, communications interface 1260 may include logic and/or features to support a communication interface. For these examples, communications interface 1260 may include one or more communication interfaces that operate according to various communication protocols or standards to communicate over direct or network communication links. Direct communications may occur via use of communication protocols or standards described in one or more industry standards (including progenies and variants) such as those associated with the PCIe specification, the NVMe specification, the RDMA Protocol specification, the IEEE 802-2-2008 specification, RFC 791 or RFC 793.

The components and features of NW I/O device 1200 may be implemented using any combination of discrete circuitry, application specific integrated circuits (ASICs), logic gates and/or single chip architectures. Further, the features of NW I/O device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary NW I/O device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Figure 13:
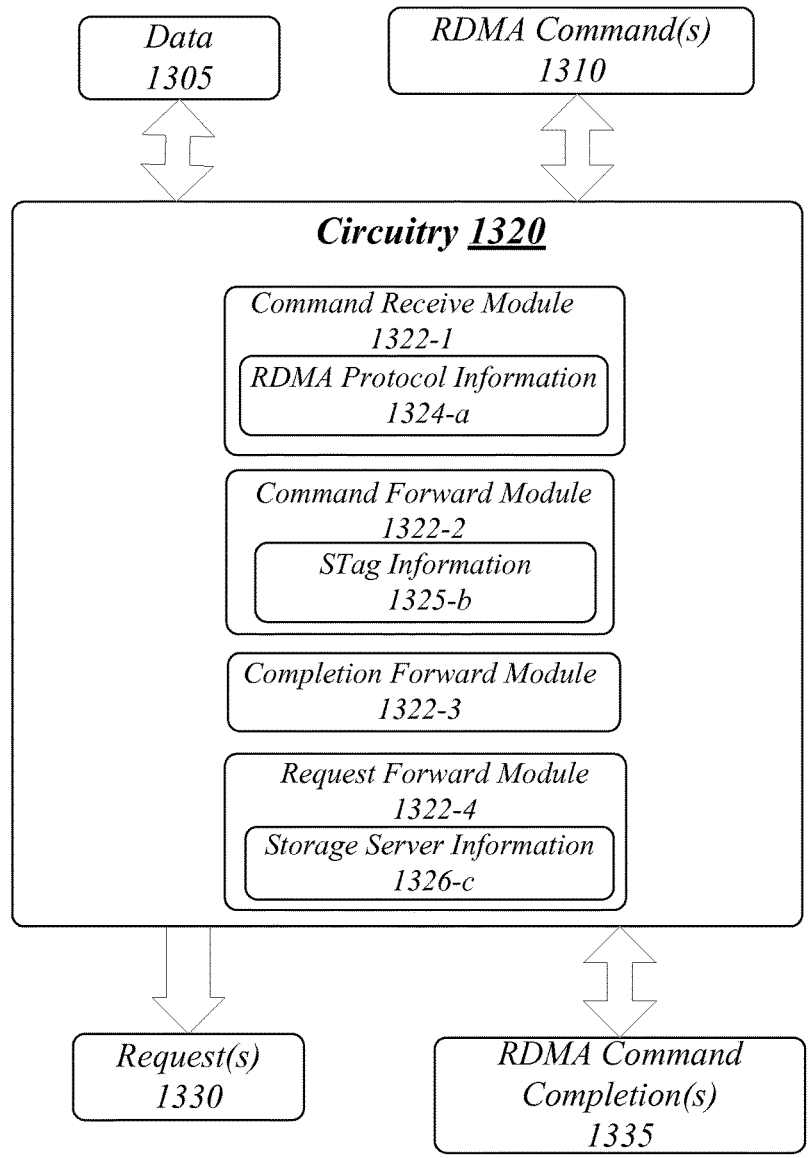
FIG. 13 illustrates an example block diagram for a second apparatus.

FIG. 13 illustrates an example block diagram of a second apparatus. As shown in FIG. 13, the second apparatus includes apparatus 1300. Although apparatus 1300 shown in FIG. 13 has a limited number of elements in a certain topology, it may be appreciated that the apparatus 1300 may include more or less elements in alternate topologies as desired for a given implementation.

The apparatus 1300 may be supported by circuitry 1320 maintained at a NW I/O device located at or coupled to a storage server that may be remote to a client device (e.g., remote client). Circuitry 1320 may be arranged to execute one or more software or firmware implemented components or modules 1322-*a*. It is worthy to note that "a" and "b" and "c" and similar designators as used herein are intended to be variables representing any positive integer. Thus, for example, if an implementation sets a value for a=4, then a complete set of software or firmware for modules 1322-*a* may include modules 1322-1, 1322-2, 1322-3 or 1322-4. The examples presented are not limited in this context and the different variables used throughout may represent the same or different integer values.

According to some examples, circuitry 1320 may include a processor or processor circuitry. The processor or processor circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 1320 may also be an application specific integrated circuit (ASIC) and at least some modules 1322-*a* may be implemented as hardware elements of the ASIC.

According to some examples, apparatus 1300 may include a command receive module 1322-1 for execution by circuitry 1320. Command receive module 1322-1 may be capable of receiving a first RDMA command message included in RDMA command(s) 1310 from a remote client via a first network connection. The first RDMA command message may be associated with storing data included in data 1305 at a first storage device controlled by a first NVMe controller maintained at the first storage server. For these examples, command receive module 1322-1 may be capable of at least temporarily storing RDMA protocol information 1324-*a* (e.g., in a data structure such as a LUT). RDMA protocol information 1324-*a* may be based on at least one of the protocols associated with, iWARP, Infiniband or RoCE and may be used by command receive module 1322-1 to receive the first RDMA command message.

In some examples, apparatus 1300 may also include a command forward module 1322-2 for execution by circuitry 1320. Command forward module 1322-2 may be capable of forwarding the first RDMA command message to the first NVMe controller to cause the first NVMe controller to obtain data included in data 1305 from the remote client responsive to the first RDMA command message included in RDMA command(s) 1310 and store the data to the first storage device. For these examples, command forward module 1322-2 may be capable of at least temporarily maintaining STag information 1325-*b* in a data structure such as a LUT or a non-volatile memory. STag information 1325-*b* may include one or more STags associated with allocated portion(s) of the first storage device.

In some examples, apparatus 1300 may also include a completion forward module 1322-3 for execution by circuitry 1320. Completion forward module 1322-3 may be capable of forwarding an RDMA command completion message included in RDMA command completion(s) 1335 to the remote client from the first NVMe controller to indicate the storing of the data included in data 1305 to the first storage device.

According to some examples, command receive module 1322-1 may also be capable of receiving a second RDMA command message included in RDMA command completion(s) 1310. For these examples, the second RDMA command message may be associated with replicating the data included in data 1305 and that was stored to the first storage device. Also, for these examples, command forward module 1322-3 may forward the second RDMA command message to the first NVMe controller to cause the data stored at the first storage device to be readable by the second storage server. Causing the data to be readable may enable the second storage server to replicate the data via storing the data to a second storage device controlled by a second NVMe controller maintained at the second storage server. For these examples, replicating data may also include adding at least some error correction codes/checksums to protect data from at least some errors that may occur during data replication between storage servers.

According to some examples, apparatus 1300 may also include a request forward module 1322-4 for execution by circuitry 1320. Request forward module 1322-4 may be capable of forwarding one or more request messages included in request(s) 1330 from the first NVMe controller to have the second storage server replicate the data stored to the first storage device. For these examples, command receive module 1322-1 may receive the second RDMA command message in response to the request message forwarded to the second storage server.

The one or more RDMA protocols may include, but are not limited to, iWARP, Infiniband or RoCE protocols. Also, for these examples, request forward module 1322-4 may at least temporarily maintain storage server information 1326-c (e.g., in a LUT) to facilitate the sending of request message(s) to the second storage server and to possibly other storage servers to replicate the data included in data 1305.

According to some examples, RDMA command(s) 1310, request(s) 1330 and RDMA command completion(s) 1335 may be exchanged between a storage server having apparatus 1300 and a remote client or other storage servers as described above for systems 600, 700 or 800 in FIGS. 6-8. Examples are not limited in this context.

FIG. 14 illustrates an example of a second logic flow. As shown in FIG. 14, the second logic flow includes logic flow 1400. Logic flow 1400 may be representative of some or all of the operations executed by one or more logic, features, or devices described herein, such as apparatus 1300. More particularly, logic flow 1400 may be implemented by command receive module 1322-1, command forward module 1322-2, completion forward module 1322-3 or request forward module 1322-4.

According to some examples, logic flow 1400 at block 1402 may receive a first remote RDMA command message from a remote client via a first network connection. The first RDMA command message may be associated with storing data at a first storage device controlled by a first NVMe controller maintained at the first storage server. For example, command receive module 1322-1 may receive the first RDMA command message for storing data included in data 1305 in a first RDMA command message included in RDMA command(s) 1310.

In some examples, logic flow 1400 at block 1404 may forward the first RDMA command message to the first NVMe controller to cause the first NVMe controller to obtain the data from the remote client responsive to the RDMA command message and store the data to the storage device. For example, command forward module 1322-2 may forward the first RDMA command message to the first NVMe controller for data included in data 1305 to be stored to the first storage device.

According to some examples, logic flow 1400 at block 1406 may forward an RDMA command completion message to the client device from the first NVMe controller to indicate the storing of the data. For example, completion forward module 1322-3 may forward the RDMA command completion message via RDMA command completion(s) 1335 to the remote client.

In some examples, logic flow 1400 at block 1408 may receive a second RDMA command message via a second network connection from a second storage server. The second RDMA command message may be associated with replicating the data stored to the first storage device. For example, command receive module 1322-1 may receive the second RDMA command message via the second network connection with the second storage server.

According to some examples, logic flow 1400 at block 1410 may forward the second RDMA command message to the first NVMe controller to cause the data stored at the first storage device to be readable by the second storage server to enable the second storage server to replicate the data via storing the data to a second storage device controlled by a second NVMe controller maintained at the second storage server. For example, command forward module 1322-2 may forward the second RDMA command message to the first NVMe controller. The first NVMe controller may then enable the second storage server to replicate the data included in data 1305 to the second storage device controlled by the second NVMe controller maintained at the second storage server.

Figure 15:
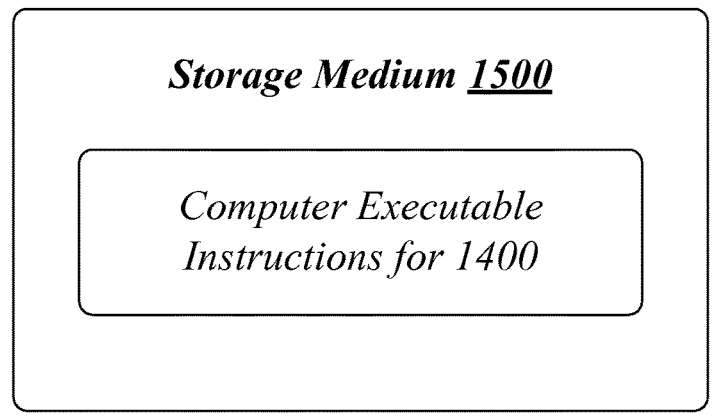
FIG. 15 illustrates an example of a second storage medium.

FIG. 15 illustrates an example of a second storage medium. As shown in FIG. 15, the second storage medium includes storage medium 1500. Storage medium 1500 may comprise an article of manufacture. In some examples, storage medium 1500 may include any non-transitory computer readable medium or machine readable medium, such as an optical, magnetic or semiconductor storage. Storage medium 1500 may store various types of computer executable instructions, such as instructions to implement logic flow 1400. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 16:
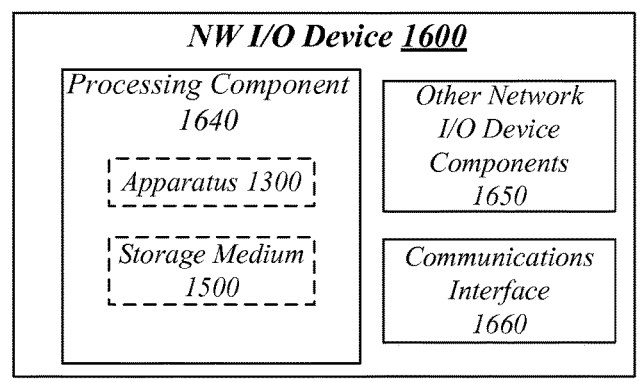
FIG. 16 illustrates an example of a second network input/output device.

FIG. 16 illustrates an example NW I/O device 1600. In some examples, as shown in FIG. 16, NW I/O device 1600 may include a processing component 1640, other platform components or a communications interface 1660. According to some examples, NW I/O device 1600 may be implemented in a NW I/O device coupled to a server capable of coupling to a remote client as mentioned above.

According to some examples, processing component 1640 may execute processing operations or logic for apparatus 1300 and/or storage medium 1500. Processing component 1640 may include various hardware elements, software elements, or a combination of both.

In some examples, other platform components 1650 may include common computing elements, such as one or more processors, multi-core processors, co-processors, memory units, chipsets, controllers, peripherals, interfaces, oscillators, timing devices, and so forth.

In some examples, communications interface 1660 may include logic and/or features to support a communication interface. For these examples, communications interface 1660 may include one or more communication interfaces that operate according to various communication protocols or standards to communicate over direct or network communication links. Direct communications may occur via use of communication protocols or standards described in one or more industry standards (including progenies and variants) such as those associated with the PCIe specification, the NVMe specification, the RDMA Protocol specification, the IEEE 802-2-2008 specification, RFC 791 or RFC 793.

The components and features of NW I/O device 1600 may be implemented using any combination of discrete circuitry, application specific integrated circuits (ASICs), logic gates and/or single chip architectures. Further, the features of NW I/O device 1600 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary NW I/O device 1600 shown in the block diagram of FIG. 16 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

In some examples, an example first apparatus for a network, I/O device may include circuitry. The example first apparatus may also include a command module for execution by the circuitry to send an RDMA command message to store data for replication at a plurality of storage servers. The RDMA command message may be sent to one or more storage servers from among the plurality of storage servers via at least one network connection between the one or more storage servers and the network I/O device. The example first apparatus may also include a completion module for execution by the circuitry to receive one or more RDMA command completion messages from the one or more storage servers that indicate replication of the data between at least a first storage server and a second storage server from among the plurality of storage servers.

In some examples for the example first apparatus, the command module may send the RDMA command message to both the first storage server and the second storage server via respective first and second network connections and the completion module to receive respective first and second RDMA command completion messages from the first and second storage servers that indicate replication of the data between at least the first and second storage servers.

According to some examples for the example first apparatus, the command module sending the RDMA command message to the first storage server may include the command module to send the RDMA command message to a first NVMe controller maintained at the first storage server that controls a first storage device and cause the data to be pushed to one or more buffers at the first storage device. The first NVMe controller may be capable of causing the first RDMA command completion message to be sent to the network I/O device based on reading the data from the one or more buffers and storing the data to the first storage device. For these examples, the command module sending the RDMA command message to the second storage server includes the command module to send the RDMA command message to a second NVMe controller maintained at the second storage server that controls a second storage device and cause the data to be pushed to one or more buffers at the second storage device. The second NVMe controller may be capable of causing the second RDMA command completion message to be sent to the network I/O device based on reading the data from the one or more buffers and storing the data to the second storage device.

In some examples for the example first apparatus, the command module may send the RDMA command message to a third storage server via a first network connection between the third storage server and the network I/O device. For these examples, the RDMA command message destined for an NVMe controller maintained at the third storage server that controls a storage device. The NVMe controller capable of obtaining the data from the client device responsive to the RDMA command message, storing the data to the storage device and causing the RDMA command completion message to be sent to the completion module to indicate storage of the data. The example first apparatus may also include a request module for execution by the circuitry to send a first request message to the first storage server via a second network connection between the network I/O device and the first storage server to have the first storage server replicate the data stored to the storage device. For these examples, the request module may send a second request message to the second storage server via a third network connection between the network I/O device and the second storage server to have the second storage server replicate the data stored to the storage device.

According to some examples for the example first apparatus, the command module may cause the data to be pushed to one or more buffers at the third storage device and indicate a location for the data in the RDMA command message. For these examples, the completion module to receive the RDMA command completion message from the NVMe controller based on the NVMe controller reading the data from the one or more buffers and storing the data to an allocated portion of the storage device.

In some examples for the example first apparatus, the command module may cause the data to be pushed to one or more buffers at a client device coupled to the network I/O device and indicate a location for the data in the RDMA command message. A network I/O device at the third storage server may be capable of pulling the data from the one or more buffers at the client device to at least temporarily store the data to one or more buffers at the third storage server. For these examples, the completion module to receive the RDMA command completion message from the NVMe controller based on the NVMe controller reading the data from the one or more buffers at the third storage server and storing the data to an allocated portion of the storage device.

According some examples for the example first apparatus, the command module may send the RDMA command message to a third storage server via a first network connection between the third storage server and the network I/O device. The RDMA command message may be destined for a NVMe controller maintained at the third storage server that controls a storage device. For these examples, the completion module may receive the RDMA command completion message from the NVMe controller based on the NVMe controller reading the data from the network I/O device responsive to the RDMA command message and storing the data to an allocated portion of the storage device. The NVMe controller may also send a first request message to the first storage server via a second network connection between the third storage server and the first storage server to have the first storage server replicate the data stored to the storage device and send a second request message to the second storage server via a third network connection between the third storage server and the second storage server to have the second storage server replicate the data stored to the storage device.

In some examples for the example first apparatus, the RDMA command message and the RDMA command completion message may be compliant with a protocol to include one of iWARP, Infiniband or RoCE.

According to some examples, the example first apparatus may also include a memory to include at least one of a non-volatile memory or a volatile memory. The memory may be capable of at least temporarily storing information associated with storing data for replication at the plurality of storage servers. The information may include one or more RDMA STags, at least one RDMA service tag from among the one or more RDMA service tags to be included in the RDMA command message.

In some examples, example first methods implemented at a network I/O device may include sending an RDMA command message to store data for replication at a plurality of storage servers. The RDMA command message may be sent to one or more storage servers from among the plurality of storage servers via at least one network connection between the one or more storage servers and the network I/O device. The example first methods may also include receiving one or more RDMA command completion messages from the one or more storage servers to indicate replication of the data between at least a first storage server and a second storage server from among the plurality of storage servers.

According to some examples, the example first methods may also include sending the RDMA command message to both the first storage server and the second storage server via respective first and second network connections and receiving respective first and second RDMA command completion messages from the first and second storage servers that indicate replication of the data between at least the first and second storage servers.

In some examples for the example first methods, sending the RDMA command message to the first storage server may include sending the RDMA command message to an NVMe controller maintained at the first storage server that controls a first storage device. The example first methods may also include sending the data to one or more buffers at the first storage server, the first NVMe controller capable of causing the first RDMA command completion message to be sent to the network I/O device based on reading the data from the one or more buffers and storing the data to the first storage device. The example first methods may also include sending the RDMA command message to the second storage server includes sending the RDMA command message to a second NVMe controller maintained at the second storage server that controls a second storage device and sending the data to one or more buffers at the second storage server. The second NVMe controller may be capable of causing the second RDMA command completion message to be sent to the network I/O device based on reading the data from the one or more buffers and storing the data to the second storage device.

According to some examples, the example first methods may also include sending, via a third network connection, error correction or data recovery information associated with the data replicated to the first and second storage servers to a third storage server. For these examples, the error correction or data recovery information for use to correct one or more errors in the replicated data or recover at least portions of the replicated data.

In some examples, the example first methods may also include sending the RDMA command message to a third storage server via a first network connection between the third storage server and the network I/O device. The RDMA command message may be destined for a NVMe controller maintained at the third storage server that controls a storage device. The NVMe controller may be capable of obtaining the data from the network I/O device responsive to the RDMA command message, storing the data to the storage device and causing the RDMA command completion message to be sent to the network I/O device to indicate the storing of the data. The example first methods may also include sending a first request message to the first storage server via a second network connection between the network I/O device and the first storage server to have the first storage server replicate the data stored to the storage device. The example first methods may also include sending a second request message to the second storage server via a third network connection between the network I/O device and the second storage server to have the second storage server replicate the data stored to the storage device.

According to some examples, the example first methods may also include sending the data to one or more buffers at the third storage device and indicating a location for the data in the RDMA command message, the NVMe controller capable of causing the RDMA command completion message to be sent to the network I/O device based on reading the data from the one or more buffers and storing the data to an allocated portion of the storage device.

In some examples, the example first methods may also include sending the data to one or more buffers at a client device coupled to the network I/O device. The example first methods may also include indicating a location for the data in the RDMA command message. A network I/O device at the third storage server may be capable of pulling the data from the one or more buffers at the client device to at least temporarily store the data to one or more buffers at the third storage server. The NVMe controller may be capable of causing the RDMA command completion message to be sent to the network I/O device coupled to the client device based on reading the data from the one or more buffers at the third storage server and storing the data to an allocated portion of the storage device.

According to some examples, the example first methods may also include sending error correction or data recovery information associated with the data replicated to the first and second storage servers to a fourth storage server via a fourth network connection between the network I/O device and the fourth storage server. For these examples, the error correction or data recovery information for use to correct one or more errors in the replicated data or recover at least portions of the replicated data.

In some examples, the example first methods may also include sending the RDMA command message to a third storage server via a first network connection between the third storage server and the network I/O device. The RDMA command message destined for an NVMe controller maintained at the third storage server that controls a storage device. The example first methods may also include receiving the RDMA command completion message from the NVMe controller based on the NVMe controller reading the data from the network I/O device responsive to the RDMA command message and storing the data to an allocated portion of the storage device. The NVMe controller to also send a first request message to the first storage server via a second network connection between the third storage server. The first storage server to have the first storage server replicate the data stored to the storage device and send a second request message to the second storage server via a third network connection between the third storage server and the second storage server to have the second storage server replicate the data stored to the storage device.

According to some examples for the example first methods, the RDMA command message and the RDMA command completion message may be compliant with a protocol to include one of iWARP, Infiniband or RoCE.

In some examples, a first at least one machine readable medium comprising a plurality of instructions that in response to being executed on a network I/O device causes the network I/O device to send an RDMA command message to store data for replication at a plurality of storage servers. The RDMA command message may be sent to one or more storage servers from among the plurality of storage servers via at least one network connection between the one or more storage servers and the network I/O device. The RDMA command message may be compliant with a protocol to include one of iWARP, Infiniband or RoCE. The instructions may also cause the network I/O device to receive one or more RDMA command completion messages from the one or more storage servers to indicate replication of the data between at least a first storage server and a second storage server from among the plurality of storage servers, the RDMA command completion message compliant with the protocol.

According to some examples for the first at least one machine readable medium, the instructions to also cause the network I/O device to send the RDMA command message to both the first storage server and the second storage server via respective first and second network connections and receive respective first and second RDMA command completion messages from the first and second storage servers that indicate replication of the data between at least the first and second storage servers.

In some examples for the first at least one machine readable medium, the instructions may also cause the network I/O device to send the RDMA command message to a NVMe controller maintained at the first storage server that controls a first storage device and cause the data to be pushed to one or more buffers at the first storage server. The first NVMe controller may be capable of causing the first RDMA command completion message to be sent to the network I/O device based on reading the data from the one or more buffers and storing the data to the first storage device. The instructions may also cause the network I/O device to send the RDMA command message to a second NVMe controller maintained at the second storage server that controls a second storage device and cause the data to be pushed to one or more buffers at the second storage server, the second NVMe controller capable of causing the second RDMA command completion message to be sent to the network I/O device based on reading the data from the one or more buffers and storing the data to the second storage device.

According to some examples for the first at least one machine readable medium, the instructions to also cause the network I/O device to send the RDMA command message to a third storage server via a first network connection between the third storage server and the network I/O device. The RDMA command message may be destined for an NVMe controller maintained at the third storage server that controls a storage device. The NVMe controller may be capable of obtaining the data from the network I/O device responsive to the RDMA command message, storing the data to the storage device and causing the RDMA command completion message to be sent to the network I/O device to indicate the storing of the data. The instructions may also cause the network I/O device to send a first request message to the first storage server via a second network connection between the network I/O device and the first storage server to have the first storage server replicate the data stored to the storage device. The instructions may also cause the network I/O device to send a second request message to the second storage server via a third network connection between the client device and the second storage server to have the second storage server replicate the data stored to the storage device.

In some examples for the first at least one machine readable medium, the instructions may also cause the network I/O device to send the RDMA command message to a third storage server via a first network connection between the third storage server and the network I/O device, the RDMA command message destined for an NVMe controller maintained at the third storage server that controls a storage device. The instructions may also cause the network I/O device to receive the RDMA command completion message from the NVMe controller based on the NVMe controller reading the data from the network I/O device responsive to the RDMA command message and storing the data to an allocated portion of the storage device. The NVMe controller may also send a first request message to the first storage server via a second network connection between the third storage server and the first storage server to have the first storage server replicate the data stored to the storage device and send a second request message to the second storage server via a third network connection between the third storage server and the second storage server to have the second storage server replicate the data stored to the storage device.

In some examples, an example second apparatus for a network, I/O device may include circuitry. The example second apparatus may also include a command receive module for execution by the circuitry to receive a first RDMA command message from a remote client via a first network connection. The first RDMA command message associated with storing data at a first storage device controlled by a first NVMe controller maintained at a first storage server coupled to the network I/O device. The example second apparatus may also include a command forward module for execution by the circuitry to forward the first RDMA command message to the first NVMe controller to cause the first NVMe controller to obtain the data from the remote client responsive to the first RDMA command message and store the data to the storage device. The example second apparatus may also include a completion forward module for execution by the circuitry to forward an RDMA command completion message to the remote client from the first NVMe controller to indicate the storing of the data. The command receive module may receive a second RDMA command message via a second network connection from a second storage server. The second RDMA command message associated with replicating the data stored to the first storage device. The example second apparatus may also include the command forward module to forward the second RDMA command message to the first NVMe controller to cause the data stored at the first storage device to be readable by the second storage server to enable the second storage server to replicate the data via storing the data to a second storage device controlled by a second NVMe controller maintained at the second storage server.

In some examples, the example second apparatus may also include a request forward module for execution by the circuitry to forward a request message from the first NVMe controller to have the second storage server replicate the data stored to the first storage device. The command receive module to receive the second RDMA command message in response to the request message forwarded to the second storage server.

According to some examples for the example second apparatus, the command forward module may forward the second RDMA command message to the first NVMe controller to cause the data stored at the first storage device to be readable by the second storage server by the second RDMA command message including an RDMA STag to indicate a location for the data stored at the first storage device. A second network I/O device at the second storage server may be capable of pulling data from the first storage device using the RDMA STag and the second NVMe controller capable of storing the pulled data to the second storage device in order to replicate the data.

In some examples for the example second apparatus, the command forward module may forward the second RDMA command message to the first NVMe controller to cause the data stored at the first storage device to be readable by the second storage server by causing the data stored at the first storage device to be pushed to one or more buffers at the second storage server. For these examples, the command forward module may include an RDMA STag with the forwarded second RDMA command to indicate an allocated portion to store the data to the second storage device. The second NVMe controller may be capable of reading the data pushed to the one or more buffers at the second storage server and storing the data to the allocated portion using the RDMA STag in order to replicate the data.

According to some examples, the RDMA command message and the RDMA command completion message may be compliant with a protocol to include one of iWARP, Infiniband or RoCE.

In some examples for the example second apparatus, the first storage device may include a solid state drive (SSD) having non-volatile memory comprising at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

According to some examples, the example second apparatus may also include a memory having at least one of a non-volatile memory or a volatile memory. The memory may be capable of at least temporarily storing information associated with storing data for replication at the second storage server. The information may include one or more RDMA STags, at least one RDMA STag from among the one or more RDMA STags to be included in the second RDMA command message forwarded to the first NVMe controller by the command forward module to cause the data stored at the first storage device to be readable by the second storage server.

In some examples, example second methods implemented at a network I/O device may include receiving, at a network I/O device, a first RDMA command message from a remote client via a first network connection. The first RDMA command message may be associated with storing data at a first storage device controlled by a first NVMe controller maintained at a first storage server coupled to the network I/O device. The example first methods may also include forwarding the first RDMA command message to the first NVMe controller to cause the first NVMe controller to obtain the data from the remote client responsive to the RDMA command message and store the data to the first storage device. The example first methods may also include forwarding an RDMA command completion message to the remote client device from the first NVMe controller to indicate the storing of the data. The example first methods may also include receiving a second RDMA command message via a second network connection from a second storage server, the second RDMA command message associated with replicating the data stored to the first storage device. The example first methods may also include forwarding the second RDMA command message to the first NVMe controller to cause the data stored at the first storage device to be readable by the second storage server to enable the second storage server to replicate the data via storing the data to a second storage device controlled by a second NVMe controller maintained at the second storage server.

According to some examples, the example second methods may also include receiving the second RDMA command message in response to a request message sent to the second storage server to have the second storage server replicate the data stored to the first storage device. For these examples, the request message may be sent from one of the first storage server or the remote client.

In some examples for the example second methods, forwarding the second RDMA command message to the first NVMe controller to cause the data stored at the first storage device to be readable by the second storage server may involve including with the second RDMA command message an RDMA STag to indicate a location for the data stored at the first storage device, a second network I/O device at the second storage server capable of pulling data from the first storage device using the RDMA STag and the second NVMe controller capable of storing the pulled data to the second storage device in order to replicate the data.

According to some examples for the example second methods, the RDMA STag may be received with the request message sent from one of the first storage server or the remote client.

In some examples for the example second methods, forwarding the second RDMA command message to the first NVMe controller to cause the data stored at the first storage device to be readable by the second storage server may include pushing the data stored at the first storage device to one or more buffers at the second storage server. For these examples, an RDMA STag may be included with the second RDMA command to indicate an allocated portion to store the data to the second storage device, the second NVMe controller capable of reading the data pushed to the one or more buffers at the second storage server and storing the data to the allocated portion using the RDMA STag in order to replicate the data.

According to some examples for the example second methods, the RDMA STag may be received with the request message sent from one of the first storage server or the remote client.

In some examples for the example second methods, the RDMA command message and the RDMA command completion message may be compliant with a protocol to include one of iWARP, Infiniband or RoCE.

In some examples for the example second methods, the first storage device may include an SSD having non-volatile memory comprising at least one of 3-dimensional cross-point memory, flash memory, ferroelectric memory, silicon-oxide-nitride-oxide-silicon (SONOS) memory, polymer memory, nanowire, ferroelectric transistor random access memory (FeTRAM or FeRAM), nanowire or electrically erasable programmable read-only memory (EEPROM).

In some examples, a second at least one machine readable medium comprising a plurality of instructions that in response to being executed on a network I/O device causes the network I/O device to receive a first RDMA command message from a remote client via a first network connection. The first RDMA command message may be associated with storing data at a first storage device controlled by a first NVMe controller maintained at a first storage server coupled to the network I/O device, the RDMA command message compliant with a protocol to include one of iWARP, Infiniband or RoCE. The instructions may also cause the network I/O device to forward the first RDMA command message to the first NVMe controller to cause the first NVMe controller to obtain the data from the remote client responsive to the RDMA command message and store the data to the first storage device. The instructions may also cause the network I/O device to forward an RDMA command completion message to the remote client from the NVMe controller to indicate the storing of the data, the RDMA command completion message compliant with the protocol. The instructions may also cause the network I/O device to receive a second RDMA command message via a second network connection from a second storage server, the second RDMA command message associated with replicating the data stored to the first storage device, the second RDMA command message compliant with the protocol. The instructions may also cause the network I/O device to forward the second RDMA command message to the first NVMe controller to cause the data stored at the first storage device to be readable by the second storage server to enable the second storage server to replicate the data via storing the data to a second storage device controlled by a second NVMe controller maintained at the second storage server.

According to some examples for the second at least one machine readable medium, the second RDMA command message may be received in response to a request message sent to the second storage server to have the second storage server replicate the data stored to the first storage device. For these examples, the request message may be sent from one of the first storage server or the remote client.

In some examples for the second at least one machine readable medium, the instructions to cause the network I/O device to forward the second RDMA command message to the first NVMe controller to cause the data stored at the first storage device to be readable by the second storage server may include the instructions to also cause the network I/O device to include with the second RDMA command message an RDMA STag to indicate a location for the data stored at the first storage device. For these examples, a second network I/O device at the second storage server may be capable of pulling data from the first storage device using the RDMA STag and the second NVMe controller capable of storing the pulled data to the second storage device in order to replicate the data, the RDMA STag received with the request message sent from one of the first storage server or the remote client.

According to some examples for the second at least one machine readable medium, the instructions to cause the network I/O device to forward the second RDMA command message to the first NVMe controller to cause the data stored at the first storage device to be readable by the second storage server comprises the instructions may also cause the network I/O device to push the data stored at the first storage device to one or more buffers at the second storage server. These instruction may also cause the network I/O device to include an RDMA STag with the second RDMA command to indicate an allocated portion to store the data to the second storage device, the second NVMe controller capable of reading the data pushed to the one or more buffers at the second storage server and storing the data to the allocated portion using the RDMA STag in order to replicate the data, the RDMA STag received with the request message sent from one of the first storage server or the remote client.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry for a network input/output (I/O) device;
   a command module for execution by the circuitry to send a remote direct memory access (RDMA) command message to store data for replication at a plurality of storage servers comprising at least a first and a second storage server, the RDMA command message sent to at least one of the first or second storage servers via at least one network connection between the at least one of the first or second storage servers and the network I/O device; and
   a completion module for execution by the circuitry to receive one or more RDMA command completion messages from the at least first or second storage servers that indicate replication of the data between at least the first storage server and the second storage server from among the plurality of storage servers.

2. The apparatus of claim 1, comprising the command module to send the RDMA command message to both the first storage server and the second storage server via respective first and second network connections and the completion module to receive respective first and second RDMA command completion messages from the first and second storage servers that indicate replication of the data between at least the first and second storage servers.

3. The apparatus of claim 2, comprising the command module to send the RDMA command message to the first storage server includes the command module to send the RDMA command message to a first non-volatile memory express (NVMe) controller maintained at the first storage server that controls a first storage device and cause the data to be pushed to one or more buffers at the first storage device, the first NVMe controller capable of causing the first RDMA command completion message to be sent to the network I/O device based on reading the data from the one or more buffers and storing the data to the first storage device; and
   the command module to send the RDMA command message to the second storage server includes the command module to send the RDMA command message to a second NVMe controller maintained at the second storage server that controls a second storage device and cause the data to be pushed to one or more buffers at the second storage device, the second NVMe controller capable of causing the second RDMA command completion message to be sent to the network I/O device based on reading the data from the one or more buffers and storing the data to the second storage device.

4. The apparatus of claim 1, comprising:
   the command module to send the RDMA command message to a third storage server via a first network connection between the third storage server and the network I/O device, the RDMA command message destined for a non-volatile memory express (NVMe) controller maintained at the third storage server that controls a storage device, the NVMe controller capable of obtaining the data from the storage device responsive to the RDMA command message, storing the data to the storage device and causing the RDMA command completion message to be sent to the completion module to indicate storage of the data;
   a request module for execution by the circuitry to send a first request message to the first storage server via a second network connection between the network I/O device and the first storage server to have the first storage server replicate the data stored to the storage device; and
   the request module to send a second request message to the second storage server via a third network connection between the network I/O device and the second storage server to have the second storage server replicate the data stored to the storage device.

5. The apparatus of claim 4, comprising:
   the command module to cause the data to be pushed to one or more buffers at the third storage server and indicate a location for the data in the RDMA command message; and the completion module to receive the RDMA command completion message from the NVMe controller based on the NVMe controller reading the data from the one or more buffers and storing the data to an allocated portion of the storage device.

6. The apparatus of claim 4, comprising:
the command module to cause the data to be pushed to one or more buffers at a client device coupled to the network I/O device and indicate a location for the data in the RDMA command message, a network I/O device at the third storage server capable of pulling the data from the one or more buffers at the client device to at least temporarily store the data to one or more buffers at the third storage server; and
the completion module to receive the RDMA command completion message from the NVMe controller based on the NVMe controller reading the data from the one or more buffers at the third storage server and storing the data to an allocated portion of the storage device.

7. The apparatus of claim 1, comprising:
the command module to send the RDMA command message to a third storage server via a first network connection between the third storage server and the network I/O device, the RDMA command message destined for a non-volatile memory express (NVMe) controller maintained at the third storage server that controls a storage device; and
the completion module to receive the RDMA command completion message from the NVMe controller based on the NVMe controller reading the data from the network I/O device responsive to the RDMA command message and storing the data to an allocated portion of the storage device, the NVMe controller to also send a first request message to the first storage server via a second network connection between the third storage server and the first storage server to have the first storage server replicate the data stored to the storage device and send a second request message to the second storage server via a third network connection between the third storage server and the second storage server to have the second storage server replicate the data stored to the storage device.

8. The apparatus of claim 1, comprising the RDMA command message and the RDMA command completion message are compliant with a protocol to include one of internet wide area RDMA protocol (iWARP), Infiniband or RDMA over converged Ethernet (RoCE).

9. The apparatus of claim 1, comprising:
a memory to include at least one of a non-volatile memory or a volatile memory, the memory capable of at least temporarily storing information associated with storing data for replication at the plurality of storage servers, the information to include one or more RDMA service tags (STags), at least one RDMA service tag from among the one or more RDMA service tags to be included in the RDMA command message.

10. A method comprising:
sending, at a network input/output (I/O) device, a remote direct memory access (RDMA) command message to store data for replication at a plurality of storage servers comprising at least a first and a second storage server, the RDMA command message sent to at least one of the first or second storage servers via at least one network connection between the at least one of the first or second storage servers and the network I/O device; and
receiving one or more RDMA command completion messages from the at least one of the first or second storage servers to indicate replication of the data between at least the first storage server and the second storage server from among the plurality of storage servers.

11. The method of claim 10, comprising sending the RDMA command message to both the first storage server and the second storage server via respective first and second network connections and receiving respective first and second RDMA command completion messages from the first and second storage servers that indicate replication of the data between at least the first and second storage servers.

12. The method of claim 11, comprising:
sending the RDMA command message to the first storage server includes sending the RDMA command message to a first non-volatile memory express (NVMe) controller maintained at the first storage server that controls a first storage device and sending the data to one or more buffers at the first storage server, the first NVMe controller capable of causing the first RDMA command completion message to be sent to the network I/O device based on reading the data from the one or more buffers and storing the data to the first storage device; and
sending the RDMA command message to the second storage server includes sending the RDMA command message to a second NVMe controller maintained at the second storage server that controls a second storage device and sending the data to one or more buffers at the second storage server, the second NVMe controller capable of causing the second RDMA command completion message to be sent to the network I/O device based on reading the data from the one or more buffers and storing the data to the second storage device.

13. The method of claim 10, comprising:
sending, via a third network connection, error correction or data recovery information associated with the data replicated to the first and second storage servers to a third storage server, the error correction or data recovery information for use to correct one or more errors in the replicated data or recover at least portions of the replicated data.

14. The method of claim 10, comprising:
sending the RDMA command message to a third storage server via a first network connection between the third storage server and the network I/O device, the RDMA command message destined for a non-volatile memory express (NVMe) controller maintained at the third storage server that controls a storage device, the NVMe controller capable of obtaining the data from the network I/O device responsive to the RDMA command message, storing the data to the storage device and causing the RDMA command completion message to be sent to the network I/O device to indicate the storing of the data;
sending a first request message to the first storage server via a second network connection between the network I/O device and the first storage server to have the first storage server replicate the data stored to the storage device; and
sending a second request message to the second storage server via a third network connection between the network I/O device and the second storage server to have the second storage server replicate the data stored to the storage device.

15. The method of claim 14, comprising:
sending the data to one or more buffers at the third storage server; and
indicating a location for the data in the RDMA command message, the NVMe controller capable of causing the RDMA command completion message to be sent to the network I/O device based on reading the data from the one or more buffers and storing the data to an allocated portion of the storage device.

16. The method of claim 14, comprising:
sending the data to one or more buffers at a client device coupled to the network I/O device; and
indicating a location for the data in the RDMA command message, a network I/O device at the third storage server capable of pulling the data from the one or more buffers at the client device to at least temporarily store the data to one or more buffers at the third storage server, the NVMe controller capable of causing the RDMA command completion message to be sent to the network I/O device coupled to the client device based on reading the data from the one or more buffers at the third storage server and storing the data to an allocated portion of the storage device.

17. The method of claim 14, comprising:
sending error correction or data recovery information associated with the data replicated to the first and second storage servers to a fourth storage server via a fourth network connection between the network I/O device and the fourth storage server, the error correction or data recovery information for use to correct one or more errors in the replicated data or recover at least portions of the replicated data.

18. The method of claim 10, comprising:
sending the RDMA command message to a third storage server via a first network connection between the third storage server and the network I/O device, the RDMA command message destined for a non-volatile memory express (NVMe) controller maintained at the third storage server that controls a storage device; and
receiving the RDMA command completion message from the NVMe controller based on the NVMe controller reading the data from the network I/O device responsive to the RDMA command message and storing the data to an allocated portion of the storage device, the NVMe controller to also send a first request message to the first storage server via a second network connection between the third storage server and the first storage server to have the first storage server replicate the data stored to the storage device and send a second request message to the second storage server via a third network connection between the third storage server and the second storage server to have the second storage server replicate the data stored to the storage device.

19. The method of claim 10, comprising the RDMA command message and the RDMA command completion message are compliant with a protocol to include one of internet wide area RDMA protocol (iWARP), Infiniband or RDMA over converged Ethernet (RoCE).

20. A method comprising:
receiving, at a network input/output (I/O) device, a first remote direct memory access (RDMA) command message from a remote client via a first network connection, the first RDMA command message associated with storing data at a first storage device controlled by a first non-volatile memory express (NVMe) controller maintained at a first storage server coupled to the network I/O device;
forwarding the first RDMA command message to the first NVMe controller to cause the first NVMe controller to obtain the data from the remote client responsive to the RDMA command message and store the data to the first storage device;
forwarding an RDMA command completion message to the remote client from the first NVMe controller to indicate the storing of the data;
receiving a second RDMA command message via a second network connection from a second storage server, the second RDMA command message associated with replicating the data stored to the first storage device; and
forwarding the second RDMA command message to the first NVMe controller to cause the data stored at the first storage device to be readable by the second storage server to enable the second storage server to replicate the data via storing the data to a second storage device controlled by a second NVMe controller maintained at the second storage server.

21. The method of claim 20, comprising receiving the second RDMA command message in response to a request message sent to the second storage server to have the second storage server replicate the data stored to the first storage device, the request message sent from one of the first storage server or the remote client.

22. The method of claim 21, forwarding the second RDMA command message to the first NVMe controller to cause the data stored at the first storage device to be readable by the second storage server comprises:
including with the second RDMA command message an RDMA service tag (STag) to indicate a location for the data stored at the first storage device, a second network I/O device at the second storage server capable of pulling data from the first storage device using the RDMA STag and the second NVMe controller capable of storing the pulled data to the second storage device in order to replicate the data, the RDMA STag received with the request message sent from one of the first storage server or the remote client.

23. The method of claim 21, forwarding the second RDMA command message to the first NVMe controller to cause the data stored at the first storage device to be readable by the second storage server comprises:
pushing the data stored at the first storage device to one or more buffers at the second storage server; and
including an RDMA service tag (STag) with the second RDMA command to indicate an allocated portion to store the data to the second storage device, the second NVMe controller capable of reading the data pushed to the one or more buffers at the second storage server and storing the data to the allocated portion using the RDMA STag in order to replicate the data.

24. At least one non-transitory machine readable medium comprising a plurality of instructions that in response to being executed on a network input/output (I/O) device causes the network I/O device to:
receive a first remote direct memory access (RDMA) command message from a remote client via a first network connection, the first RDMA command message associated with storing data at a first storage device controlled by a first non-volatile memory express (NVMe) controller maintained at a first storage server coupled to the network I/O device, the RDMA command message compliant with a protocol to include one of internet wide area RDMA protocol (iWARP), Infiniband or RDMA over converged Ethernet (RoCE);

forward the first RDMA command message to the first NVMe controller to cause the first NVMe controller to obtain the data from the remote client responsive to the RDMA command message and store the data to the first storage device;

forward an RDMA command completion message to the remote client from the NVMe controller to indicate the storing of the data, the RDMA command completion message compliant with the protocol;

receive a second RDMA command message via a second network connection from a second storage server, the second RDMA command message associated with replicating the data stored to the first storage device, the second RDMA command message compliant with the protocol; and forward the second RDMA command message to the first NVMe controller to cause the data stored at the first storage device to be readable by the second storage server to enable the second storage server to replicate the data via storing the data to a second storage device controlled by a second NVMe controller maintained at the second storage server.

25. The at least non-transitory one machine readable medium of claim 24, comprising the second RDMA command message received in response to a request message sent to the second storage server to have the second storage server replicate the data stored to the first storage device, the request message sent from one of the first storage server or the remote client.

* * * * *